(12) United States Patent
Okuda et al.

(10) Patent No.: US 6,262,657 B1
(45) Date of Patent: Jul. 17, 2001

(54) DRIVER ALERTING SYSTEM

(75) Inventors: Sadaharu Okuda, Shizouka-ken; Satoshi Negishi, Tokyo, both of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/479,426

(22) Filed: Jan. 7, 2000

(30) Foreign Application Priority Data

Jan. 8, 1999 (JP) .............................................. P11-003328

(51) Int. Cl.$^7$ ...................................................... B60Q 1/00
(52) U.S. Cl. ...................... 340/439; 340/438; 340/576
(58) Field of Search ................................. 340/438, 439, 340/576, 903, 990, 991, 459; 180/271, 272

(56) References Cited

U.S. PATENT DOCUMENTS

| | | | |
|---|---|---|---|
| 4,706,072 | * | 11/1987 | Ikeyama ................................ 340/576 |
| 5,432,509 | * | 7/1995 | Kajiwara ............................... 340/903 |
| 6,061,628 | * | 5/2000 | Hayashi et al. ....................... 340/990 |
| 6,087,953 | * | 7/2000 | DeLine et al. ........................ 340/438 |
| 6,125,326 | * | 9/2000 | Ohmura et al. ....................... 701/213 |

FOREIGN PATENT DOCUMENTS

| | | |
|---|---|---|
| 10-42371 | 2/1998 | (JP) . |
| 10-138791 | 5/1998 | (JP) . |
| 10-173740 | 6/1998 | (JP) . |
| 10-042371 * | 8/1998 | (JP) . |
| 10-234076 | 9/1998 | (JP) . |
| 10-276126 | 10/1998 | (JP) . |
| 10-294971 | 11/1998 | (JP) . |
| 11-98559 | 4/1999 | (JP) . |

* cited by examiner

Primary Examiner—Van T. Trieu
(74) Attorney, Agent, or Firm—Finnegan, Henderson, Farabow, Garrett & Dunner, L.L.P.

(57) ABSTRACT

In a driver alerting system, when a driver uses a portable communication terminal while driving, if the driving becomes unstable or a directional signal is operated and there is a large change in vehicle speed or direction, a telephone call detection apparatus and a running condition detection apparatus detect this condition and a controller generates a message to provide a voice warning to the operator, issued from an alarm apparatus.

13 Claims, 16 Drawing Sheets

| $f_1(t)$ \ $f_2(t)$ | 0 | 1 |
|---|---|---|
| 0 | ABNORMAL (ALARM) | NORMAL |
| 1 | ABNORMAL (ALARM) | ABNORMAL (ALARM) |

DRIVER ALERTING SYSTEM

BACKGROUND OF THE INVENTION

The invention relates to a driver alerting system, and more particularly to a driver alerting system used to alert an operator of a vehicle such as a driver of the condition of loss of attention due to the use of a portable communication terminal such as a cellular telephone.

In recent years, cellular telephones have come into widespread use, with many people using such devices in trains, inside various buildings, and in vehicles.

In the Japanese patent laid-open patent application publication H10-42371, there is a disclosure of an apparatus for limiting the use of a cellular telephone as a means of solving problems arising from such use.

SUMMARY OF THE INVENTION

According to an investigation made by the inventors, although cellular telephones provide the convenience of being usable anywhere, because of the sound of a person using a cellular telephone disturbs people near the user, and use while driving a vehicle can result in distraction of the operator of the vehicle.

In a study of the driving conditions while the driver is using a cellular telephone and the driving conditions when not using a cellular telephone, the following information was discovered.

The amount of time a driver eyes are removed from the road was 1.9 seconds when using a cellular telephone and 1.05 seconds when listening to a radio or the like while not using a cellular telephone.

The number of times the driver's eyes moved was 38.2 times when using a cellular telephone and 39.4 times when listening or looking at a radio or the like while not using a cellular telephone.

The number of times brake operation required more than 1 second was 50.0% when using a cellular telephone and 34.0% when listening or looking at a radio or the like while not using a cellular telephone.

The degree of steering wheel adjustment (amount of steering wheel change times the traveled distance) was 1107.43 while using a cellular telephone and 913.54 when listening or looking at a radio or the like.

In view of the above findings, an apparatus for limiting the use of a cellular telephone such as shown in FIG. 20 was studied.

More specifically, when a receiving/sending unit 102 provided within a given facility, such as a hospital, or within a vehicle detects a radio signal indicating the content of a telephone call from a cellular telephone 103 or a radio signal sent from the cellular telephone 103 to a base station to indicate its existence, a microcomputer 104 makes a judgment that the cellular telephone 103 is in a condition in which it can transmit or a condition in which it can receive.

Based on the results of the above-noted judgment, a jamming signal is sent from the receiving/sending unit 102 so as to disable the cellular telephone 103 and a message such as "You are inside a hospital. Do not use your cellular telephone." or "You are in a vehicle. Do not use your cellular telephone." is heard from a speaker 105, thereby limiting the use of the cellular telephone 103, this being used to restrict the use of cellular telephones within a vehicle, within an aircraft, or within a medical facility.

With the above-noted cellular telephone usage restriction apparatus 101, however, when operating a motor vehicle, by merely switching the power of the cellular telephone on, the microcomputer 104 detects this condition and disable the cellular telephone 103, so that it is not even possible to detect the reception of calls, thereby sacrificing the convenience of the cellular telephone 103.

Accordingly, in view of the above-noted drawback of the prior art, it is an object of the present invention to provide an alerting system that not only reduces the distraction caused by use of a cellular telephone, but also maintains the convenience of such portable communication terminals.

An alerting system according to the present invention has a telephone call detection section that detects when either the operator of a vehicle is using a cellular telephone or is expected to use the cellular telephone, a running condition detection section that detects the running condition of the vehicle, a running condition judgment section that, based on the detection results from the running condition detection section, makes a judgment as to whether or not the running condition of the vehicle is unstable, or is expected to become unstable, and an alerting section which when, based on the results of the telephone call detection section and the judgment results of the running condition judgment section, the operator is either using a cellular telephone or expected to use a cellular telephone, if the running condition of the vehicle is unstable or expected to become unstable, alerts the operator of the vehicle.

In the above-noted system, the running condition detection section mounted in the vehicle detects the running condition of the vehicle. The telephone call detection section detects when the operator of the vehicle is using a cellular telephone or is expected to use a cellular telephone. Based on the detection results from the running condition detection, the running condition judgment section and the alerting section judge whether or not the running condition of the vehicle is unstable and, if the running condition is unstable or is expected to become unstable, the operator of the vehicle is alerted. By doing this, even if the power to the cellular telephone is turned on while operating the vehicle, or if the cellular telephone is actually used, the convenience of the cellular telephone is maintained while preventing interference with the operation of the vehicle, thereby effectively reducing the adverse affects attributed to the use of a cellular telephone while operating a vehicle.

When the operator of a vehicle attempts to use a cellular telephone while driving the vehicle, or while the operator is using the cellular telephone, if the direction of travel or speed of the vehicle becomes unstable, or is expected with a high probability of becoming unstable, a message or the like is used to warn the vehicle operator to pay attention to operation of the vehicle.

DETAILED DESCRIPTION OF THE PREFERRED EMBODIMENTS

Preferred embodiments of the invention are described in detail below, with reference to relevant accompanying drawings.

At first, an alerting system S1 of the first embodiment according to the present invention is described.

Figure 1:
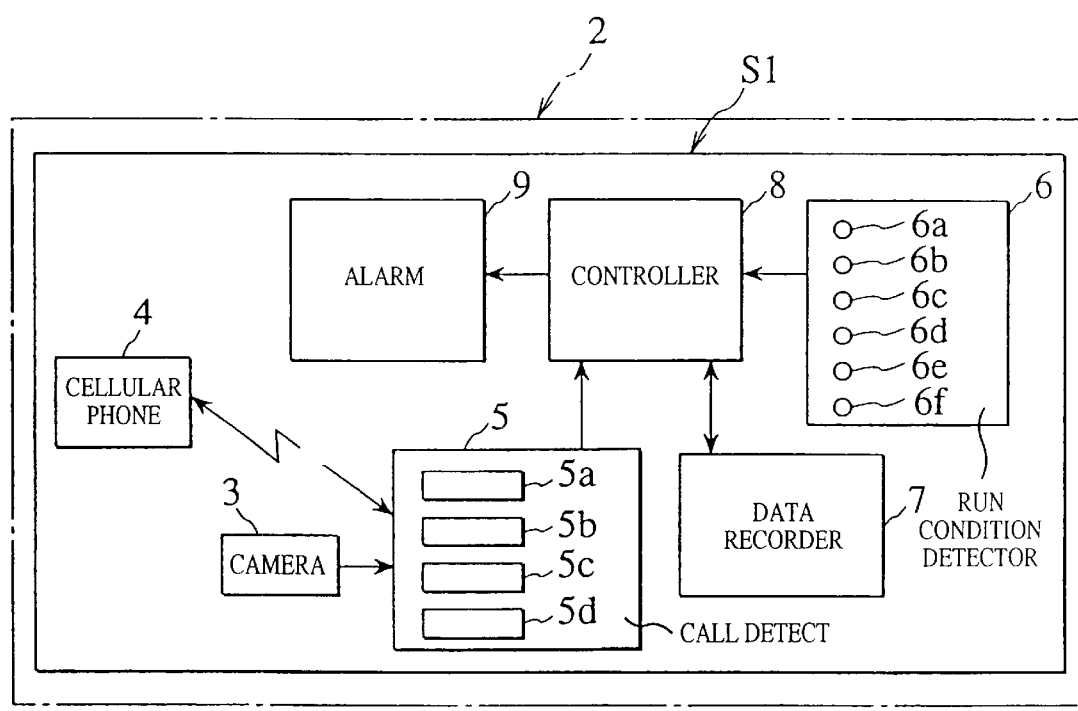
FIG. 1 is a block diagram showing the first embodiment of an alerting system according to the present invention.

FIG. 1 shows an alerting system S1 of the first embodiment, this system having a CCD camera apparatus 3, a telephone call detection apparatus 5, a running condition detection apparatus 6, a data recording apparatus 7, a controller 8, and an alarm apparatus 9, the reference numeral 4 denoting the cellular telephone being monitored.

The CCD camera apparatus 3 captures an image of the driver of the vehicle, and the telephone call detection apparatus 5, based on the picture signal output from the CCD camera apparatus 3 or a radio signal transmitted by the cellular telephone 4, detects whether or not the cellular telephone 4 is being used within the vehicle.

The running condition detection apparatus 6 is mounted to the vehicle and detects the running condition of the vehicle 2, and the data recording apparatus 7 is mounted within the vehicle 2 and records the running condition thereof.

The controller 8 captures the detection results from the running condition detection apparatus 6, and records these using the data recording apparatus 7, while making a judgment, based on the running conditions recorded in the data recording apparatus 7 and the detection results of the telephone call detection apparatus 5, as to whether driving of the vehicle is disturbed while the operator uses the cellular telephone 4 and, if it makes the judgment that driving is disturbed, it issues an alarm.

The alarm apparatus 9 is disposed within the vehicle 2 and, when alarm information is output from the controller 8, outputs an alarm so as to alert the operator of the vehicle.

According to the above-noted configuration, when the operator of a vehicle is driving while using a cellular telephone 4, when the alerting system of the present invention detects unstable running conditions of the vehicle 2 it alerts the operator.

More specifically, the CCD camera apparatus 3 is installed in a location such as on the instrument panel, enabling it to acquire a picture of the face of the operator, and when the system power is switched on and an image recording switch (not shown in the drawing) of the telephone call detection apparatus is set to on, the CCD camera apparatus 3 takes a picture of the face of the operator, the picture signal from that picture being supplied to the telephone call detection apparatus 5.

The telephone call detection apparatus 5 has an image processing circuit 5a which, when the image recording switch is in the on condition, performs a comparison between the picture signal output from the CCD camera apparatus 3 (face of the operator) and a previously recorded pictures of the face of the operator when not using the cellular telephone and while using the cellular telephone, makes a judgment as to whether or not the operator is using the cellular telephone 4, and generates cellular telephone usage information based on the results of that judgment. The telephone call detection apparatus 5 also has a radio signal strength detection circuit 5b which, when the power switch of a cellular telephone 4 in the vehicle is set to on and either a radio signal indicating that the cellular telephone 4 can be used or a radio signal from the cellular telephone 4 indicating the content of a call is transmitted, if the strength of the radio signal exceeds a previously set level, detects this signal and generates cellular telephone usage information.

Additionally, the telephone call detection apparatus 5 has a cellular telephone interception circuit 5c that, when the power supply of the cellular telephone 4 is in the on condition and a radio signal from the cellular telephone 4 or a radio signal being sent to the cellular telephone 4 is transmitted, receives and demodulates this signal and, based on the dialing number obtained by this demodulation process and a previously registered ID of the cellular telephone 4 (such as the telephone number thereof), makes a judgment as to whether the cellular telephone 4 is the phone of the vehicle operator or passenger or some other cellular telephone, and based on the content of the radio signal, makes a further judgment as to the usage condition thereof, such as transmitting or receiving, and outputs the results of this judgment. The telephone call detection apparatus 5 further has a usage judgment circuit 5d which, based on the results of the judgment output from the cellular telephone interception circuit 5c, the cellular telephone usage detection signal output from the radio signal strength detection circuit 5b, and the cellular telephone usage information output from the image processing circuit 5a, makes an overall judgment as to whether the operator of the vehicle is using the cellular telephone 4.

If the image recording switch is not in the on condition, and the power to the cellular telephone 4 in the vehicle is in the on condition, if a radio signal indicating that the cellular telephone 4 can be used is transmitted with a strength greater than a prescribed level, or if a radio signal indicating the content of a call is transmitted from the cellular telephone 4, the telephone call detection apparatus 5 detects this, generates a cellular telephone usage detection signal, and makes a judgment as to whether or not the cellular telephone 4 is the vehicle operator's cellular telephone or the cellular telephone of a passenger and, based on the content of the radio signal, makes an overall judgment as to whether or not the operator of the vehicle is using the cellular telephone 4. If the judgment is made that the operator is either using the cellular telephone 4 or that there is a large possibility that the operator will use the cellular telephone 4, detailed information indicating that the operator of the vehicle is using the cellular telephone 4 or that there is a large possibility that the operator will do so is generated and supplied to the controller 8.

In the case in which the image recording switch is in the on condition, in addition to performing the above-noted judgment processing with respect to a radio signal sent from the cellular telephone 4, the telephone call detection apparatus 5 compares the facial picture of the vehicle operator included in the image signal output from the CCD camera apparatus 3 with the previously recorded pictures of the vehicle operator's face when using and not using a cellular telephone, so as to make a judgment as to whether or not the operator is using the cellular telephone 4 and, based on the results of this judgment, generates cellular telephone usage information. Then, with respect to the judgment processing of the radio signal, and taking into consideration the cellular telephone usage information, an overall judgment is made as to whether or not the vehicle operator is using the cellular telephone or is about to use the cellular telephone and, in the case in which the judgment is made that the vehicle operator is either using the cellular telephone 4, or about to use the cellular telephone 4, detailed information indicating the fact that the vehicle operator is using or is very likely to use the cellular telephone 4 is generated and supplied to the controller.

The running condition detection apparatus 6 has a steering angle sensor 6a provide on the vehicle 2 for detecting the steering angle, an acceleration sensor 6b provided on the vehicle 2 for detecting acceleration, a vehicle speed sensor 6c provided on the vehicle 2 for detecting the running speed thereof, a parking brake sensor 6d for detecting the condition in which the parking brake is off, a direction signal sensor 6e for detecting when the directional signals of the vehicle 2 are operated, a signal processing circuit 6f for generating, based on conditions detected by these sensors, running information that indicates the running condition of the vehicle 2 and supplying this information to the controller 8, this running information including information with regard to whether the vehicle is running or stopped, the amount of change in steering angle (information indicating the degree of swerving and whether or not a lane change is made), and information indicating the speed of the vehicle.

A three-dimensional sensor which senses the lateral (left-to-right), longitudinal (front-back) and vertical acceleration can be used as the acceleration sensor 6b. The steering angle data detected by the steering sensor 6a can be used as the lateral acceleration data, and in the description presented below, the example is that of using the steering angle.

The data recording apparatus 7 has a large-capacity storage mechanism (not shown in the drawing) such as a semiconductor memory, or a hard disk storage mechanism.

Each time new running information is output at a prescribed interval from the controller 8, the data recording apparatus 7 new information is acquired and recorded by the data recording apparatus as the older running information is discarded, and when a readout command is output from the controller 8, the running data for the specified time frame is read out and supplied to the controller 8.

The controller 8 has a CPU for performing various information processing, a ROM for storage of a prescribed program that is executed by the CPU, and a RAM that is used as a working area by the CPU (these elements not shown in the drawing).

When the engine switch of the vehicle 2 is in the on condition and when prescribed conditions are satisfied, the controller 8 acquires running information output from the running condition detection apparatus 6 at a prescribed time interval, and causes the data recording apparatus to record this information, while, based on pre-established judgment conditions, a judgment is made as to whether or not the operator of the vehicle is using the cellular telephone 4 and the driving of the vehicle is disturbed. If the judgment is that the driving of the vehicle is indeed being disturbed, the controller generates alarm information and supplies it to the alarm apparatus 9.

The alarm apparatus 9 has such elements as a voice output mechanism for outputting a voice alarm message of a plurality of stored messages, a beeper for sounding an alarm beeper sound, and a lamp mechanism for lighted an alarm lamp (these elements not shown in the drawing), and when alarm information is output from the controller 8, an alarm message, beeper sound, or lamp provides an alarm which alerts the driver of the vehicle.

Next, the operation of this embodiment of an alerting system will be described in detail, with reference being made to FIG. 2 to FIG. 9.

Figure 2:
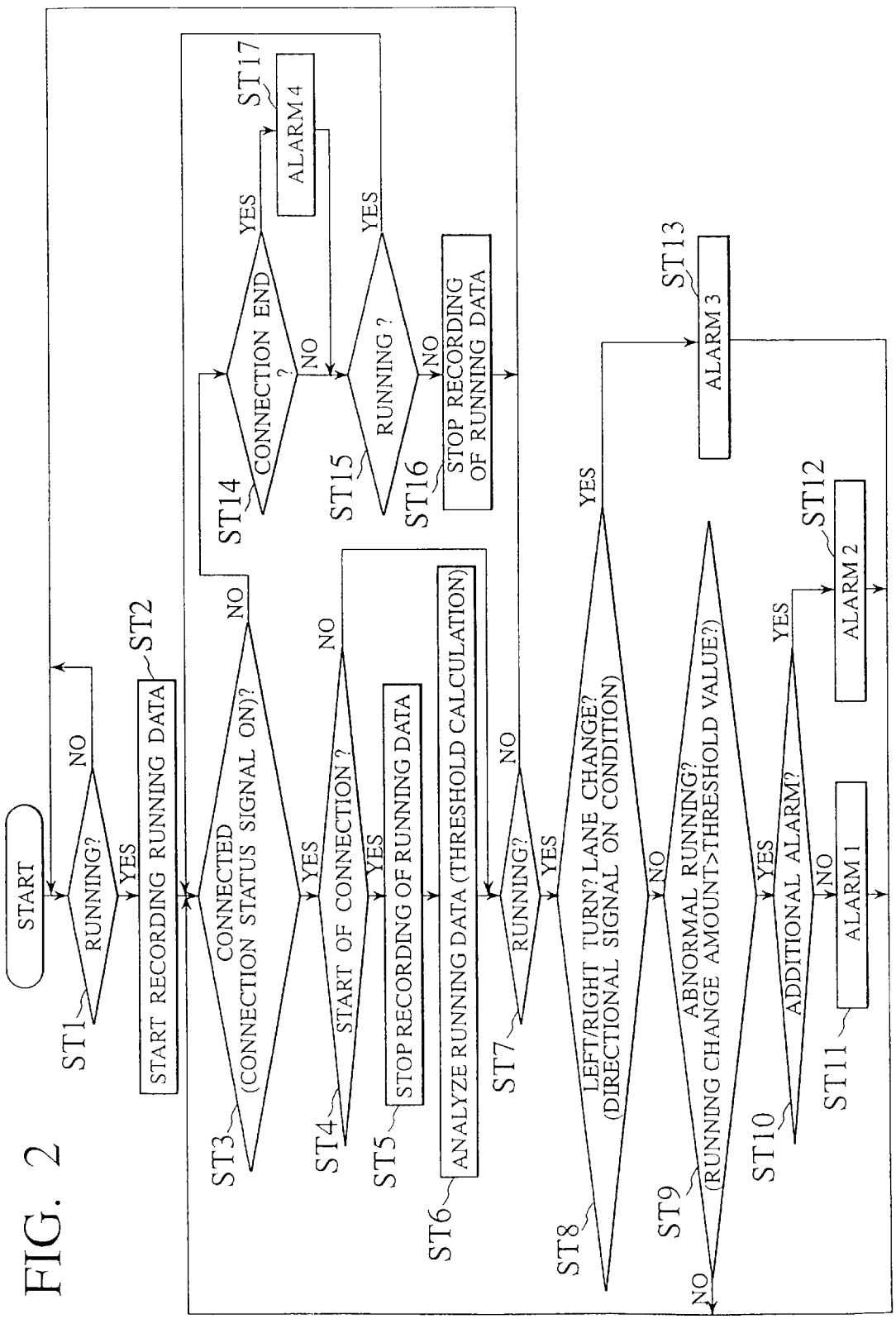
FIG. 2 is a flowchart showing an example of the operation of the first embodiment of the present invention shown in FIG. 1.

First, when the operator of the vehicle boards the vehicle and places the engine switch into the on condition, as shown in the flowchart of FIG. 2, the CPU of the controller 8 turns the running condition detection apparatus 6 to the on condition and starts the acquisition of running information that is output from the running condition detection apparatus 6 and, based on this running information, makes a judgment as to whether or not the vehicle is running (step ST1).

Next, if the vehicle 2 was in the running condition, at a prescribed time interval running information output from the running condition detection apparatus 6 is selected and stored in the data recording apparatus 7 (step ST2).

Figure 3:
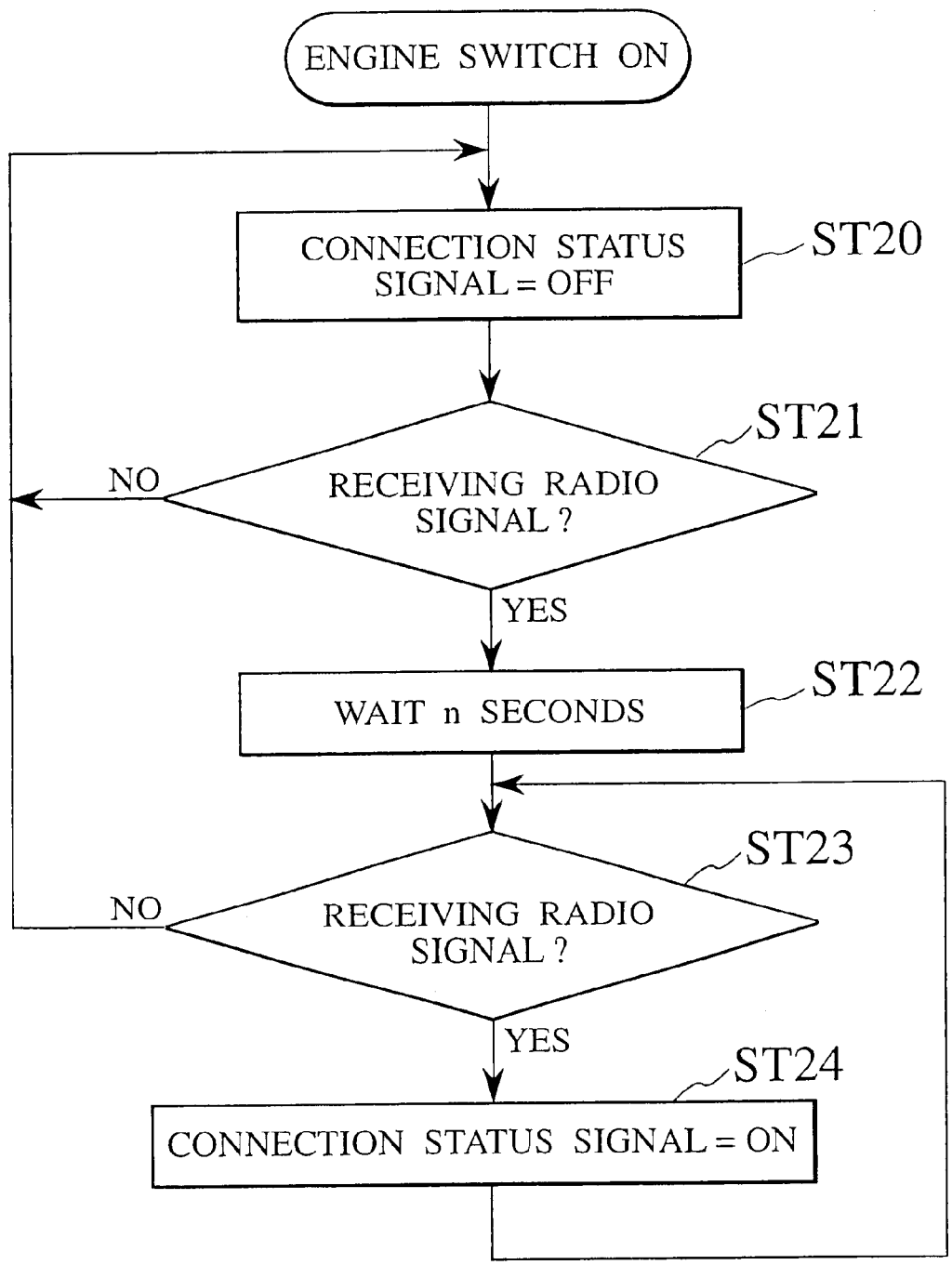
FIG. 3 a flowchart showing the operation of a radio signal strength detection circuit that serves as the telephone call detection apparatus shown in FIG. 1.

In parallel with the above-noted operation, as shown by the flowchart of FIG. 3, when the engine switch is set to the on condition, the operation of the telephone call detection apparatus 5 is started, and a status signal of the radio signal strength detection circuit provided in the telephone call detection apparatus 5 is set to the off condition (step ST20).

Next, processing is started to make a judgment as to whether a radio signal above a prescribed level indicating that the cellular telephone 4 in the vehicle is capable of being used is being transmitted (step ST21).

Figure 4:
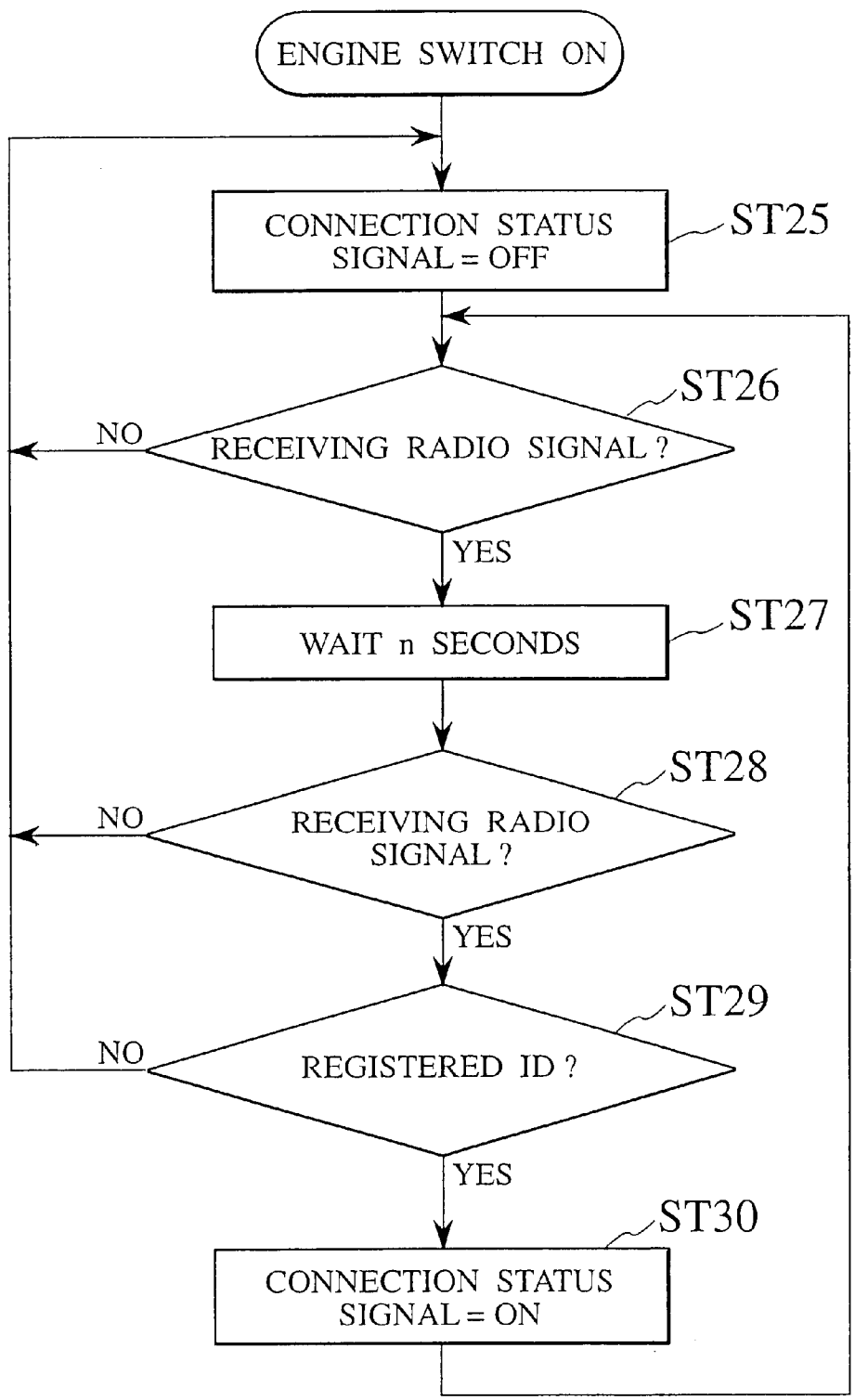
FIG. 4 is a flowchart showing the operation of a telephone call interception circuit that serves as the telephone call detection apparatus shown in FIG. 1.

Along with the above operations, as shown by the flowchart of FIG. 4, a status signal of the cellular telephone interception circuit provided in the telephone call detection apparatus 5 is set to the off condition (step ST25).

Next, processing is started for making a judgment as to whether or not a radio signal is being transmitted from the cellular telephone 4 in the vehicle (step ST26).

Figure 5:
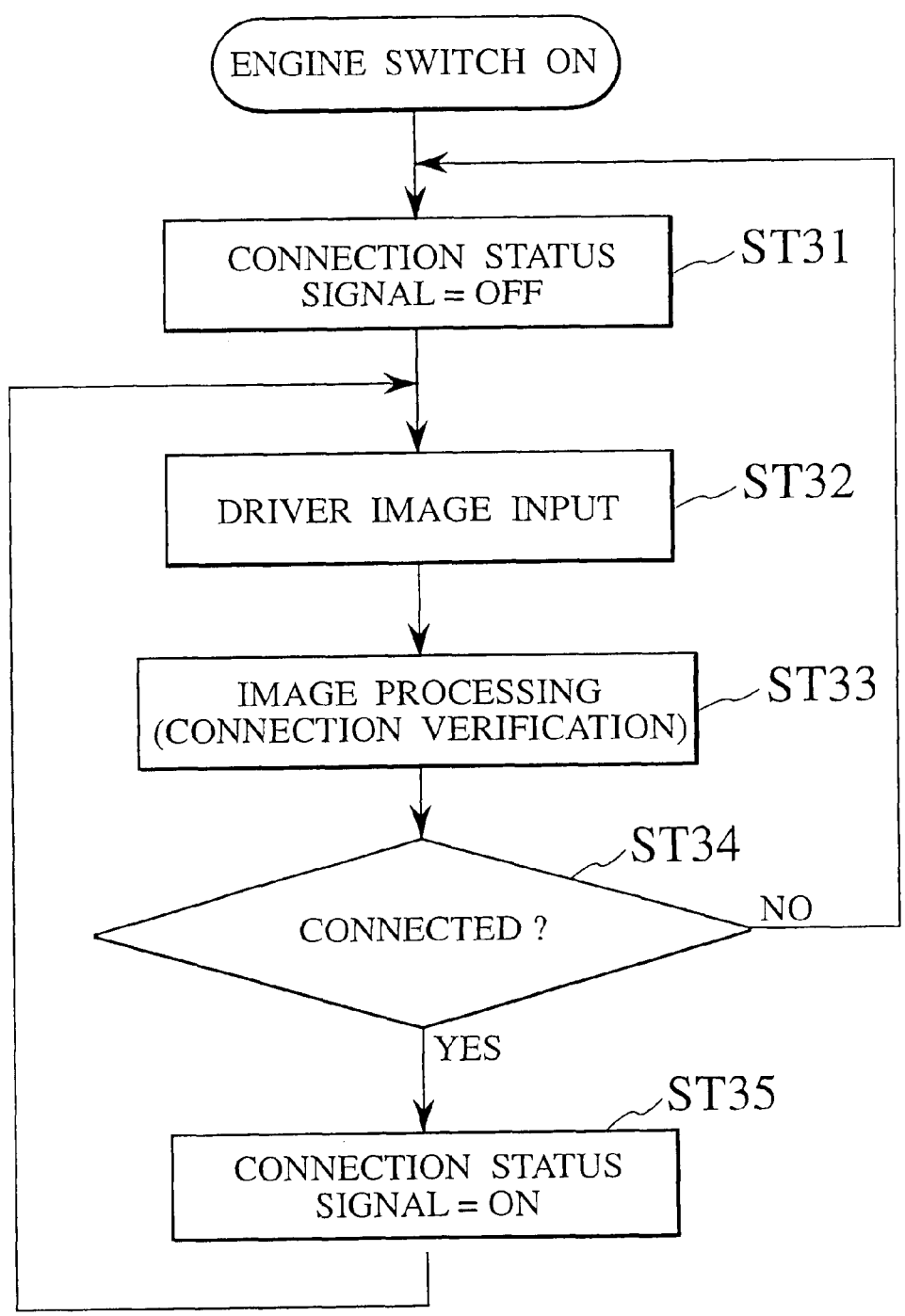
FIG. 5 is a flowchart showing the operation of an image processing circuit that serves as the telephone call detection apparatus shown in FIG. 1.

When the above is done, if the image recording switch provided on the telephone call detection apparatus 5 is in the on condition, as shown by the flowchart of FIG. 5, a status signal of the image processing circuit provided in the telephone call detection apparatus 5 is set to the off condition (step ST31).

Next, the CCD camera apparatus is placed in the on condition, and acquisition of a picture of the face of the operator of the vehicle is started (step ST32).

Next, a comparison between the image of the operator's face indicated by the picture signal obtained by the above-noted image acquisition and the previously stored pictures of the operator's face while using a cellular telephone and when not using a cellular telephone is started (step ST33).

In response to the switching off of the power of the cellular telephone 4 by the operator and removal of the face from the cellular telephone 4, the usage judgment circuit of the telephone call detection apparatus 5 outputs information that indicates the cellular telephone 4 is not being used, at which point, as shown by the flowchart of FIG. 2, the CPU of the controller 8 makes the judgment that the vehicle operator is not using the cellular telephone 4 (step ST3).

Then, until the vehicle operator starts using the cellular telephone 4 (step ST3), or until the vehicle reaches the stopped condition (step ST15), recording processing of running information by the data recording apparatus 5 is repeated (steps ST3, ST14, and ST15).

If a radio signal above a prescribed level is transmitted from the cellular telephone 4 of the operator, as shown by the flowchart of FIG. 3, the radio signal strength detection circuit of the telephone call detection apparatus 5 detects this condition (step ST21).

Next, a check is made as to whether the a radio signal above the prescribed level is detected once again after a number of seconds n has elapsed (steps ST22 and ST23). If after n seconds there was detection of a radio signal exceeding the prescribed level once again, the connection status signal of the radio signal strength detection circuit is set to the on condition, and a cellular telephone usage detection signal is generated (step ST24).

Even if for some reason the radio signal transmitted from the cellular telephone 4 is not detected by the radio signal strength detection circuit, if an off-hook operation of the cellular telephone 4 in the vehicle is performed, so that a radio signal indicating the content of the call is transmitted from the cellular telephone 4, as shown by the flowchart of FIG. 4, the cellular telephone interception circuit of the telephone call detection apparatus 5 detects this signal (step ST26).

Next, after n seconds a check is made as to whether or not detection is made again (steps ST27 and ST28).

Next, if detection of the above-noted radio signal is made again after n seconds have elapsed (steps ST26 and ST28), based on the content of the call obtained by demodulating this radio signal and the previously registered cellular telephone ID (for example, the telephone number), a judgment is made as to whether the cellular telephone 4 that is transmitting the radio signal is the cellular telephone of the vehicle operator, or of a passenger, for example and, based on the content of the radio signal, a judgment is made as to whether transmission or reception is being done (step ST29).

Next, if the judgment is made that the operator of the vehicle is using the cellular telephone 4, the connection status signal is set to the on condition and a judgment result indicating use of the cellular telephone is generated (step ST30).

Even in the case in which the radio signal strength detection circuit and the cellular telephone interception circuit do not detect usage of the cellular telephone 4, if the image recording switch of the telephone call detection apparatus 5 is in the on condition, if operator merely places the cellular telephone 4 to his or her ear, as shown by the flowchart of FIG. 5, the image processing circuit of the telephone call detection apparatus 5 performs processing to compare the image of the operator's face obtained from the picture signal from the CCD camera apparatus with previously stored pictures of the operator's face when using the cellular telephone 4 and when not using the cellular telephone 4, so as to make a judgment as to whether or not the operator is using the cellular telephone 4 or is about to use the cellular telephone 4 (step ST34).

Based on the result of the above-noted judgment, the connection status signal is set to the on condition, cellular telephone usage information is generated (step ST35).

In parallel with the above operations, if the connection status signal is in the on condition in any of the radio signal strength detection circuit, the cellular telephone interception circuit, and the image processing circuit, the cellular telephone usage judgment circuit of the telephone call detection apparatus 5, the result of detection by the radio signal strength detection circuit, the result of detection by the cellular telephone interception circuit, or the cellular telephone usage information of the image processing circuit is read in and, based on these judgment results, a judgment is made either that the vehicle operator is using the cellular telephone 4 or that there is a large possibility that the vehicle operator will use the cellular telephone 4, the result of detection by the radio signal strength detection circuit, the result of detection by the cellular telephone interception circuit, or the cellular telephone usage information of the image processing circuit is supplied to the CPU of the controller 8.

Next, as shown by the flowchart of FIG. 2, when the result of detection by the radio signal strength detection circuit, the result of detection by the cellular telephone interception circuit, or the cellular telephone usage information of the image processing circuit is output, the CPU of the controller 8 judges that the vehicle operator has started to use the cellular telephone 4 (steps ST3 and ST4), and the recording of running conditions by the data recording apparatus 7 is stopped (step ST5).

The CPU of the controller 8, based on the detected data from the running condition detection apparatus 6, and the running information recorded in the data recording apparatus 5, executes a normal/abnormal running judgment as described below.

In order to distinguish whether the driving of the vehicle by the operator is normal or abnormal, a comparison is made of the running condition (behavior) of the vehicle when a cellular telephone call is in progress and when the phone is not being used. In this embodiment of the present invention, the running condition detection apparatus 6 detects the left-to-right, front-back, and vertical acceleration of the vehicle.

The left-to-right (lateral) behavior of the vehicle can be ascertained by detecting the steering swerving caused by steering adjustments made by the driver. Front-back (longitudinal) behavior can be ascertained by detecting sudden starts (acceleration) and sudden stops (deceleration) caused by the operator using the accelerator and the brake.

Vertical-direction behavior can be ascertained by detecting the road condition (unevenness). In addition, detailed analysis can be performed to ascertain sudden turns of the vehicle (lateral direction) and changes in acceleration (longitudinal direction).

An acceleration sensor (three-dimensional acceleration sensor) can be used to detect these type of vehicle behavior. From the amount of movement change of the vehicle output from this sensor, it is possible to analyze the running condition of the vehicle. The lateral behavior of the vehicle can be determined by a steering sensor, and it is possible from the steering angle to analyze the degree of swerving of the vehicle. Using an acceleration sensor, it is possible to detect the acceleration of the vehicle in the longitudinal direction.

The method of judging the normal and abnormal conditions is described below for the example of the lateral behavior of the vehicle.

The steering angle data and the acceleration data output from the acceleration sensor mounted in the lateral direction of the vehicle describe almost the same type of waveform.

Figure 6:
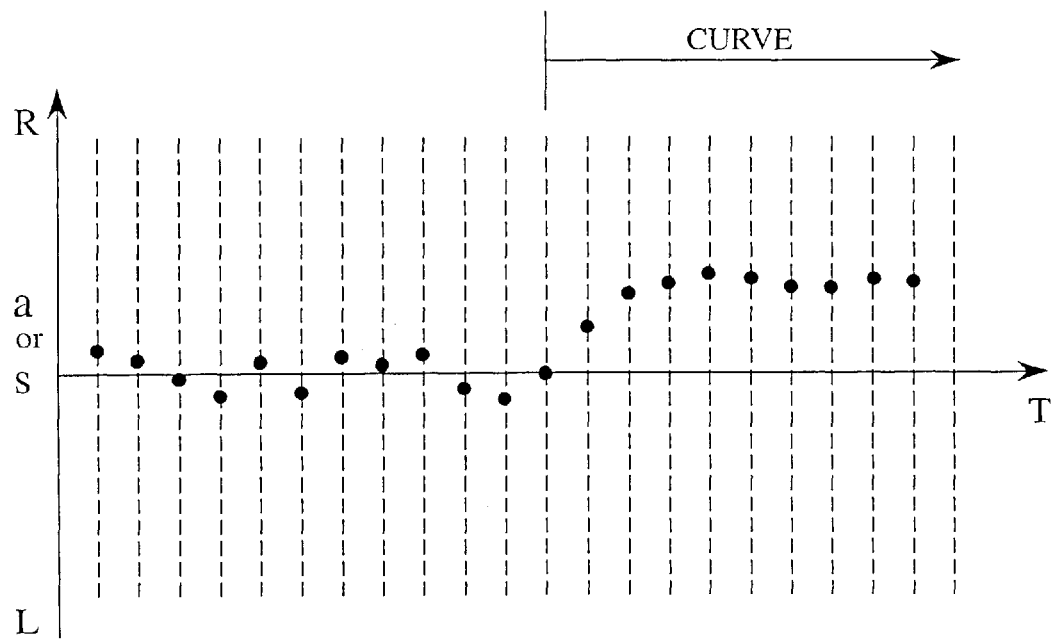
FIG. 6 is a drawing illustrating in schematic form the operation of calculating the threshold value for the running change amount performed the alerting system shown in FIG. 1.
Figure 8:
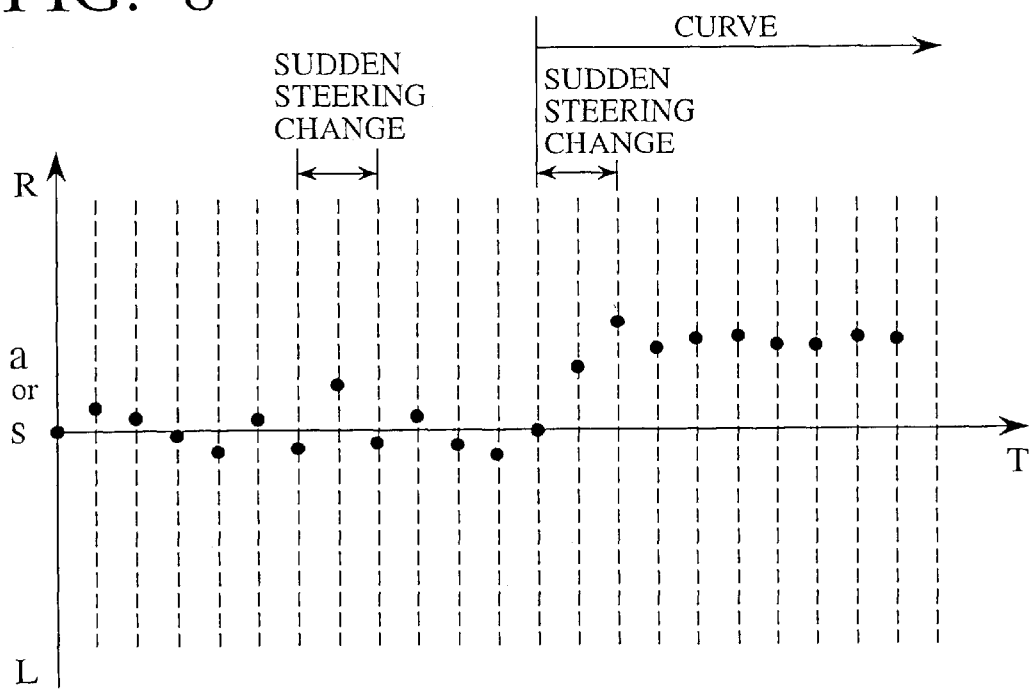
FIG. 8 is a drawing illustrating in schematic form the judgment of the running change amount performed in the alerting system shown in FIG. 1.

FIG. 6 and FIG. 8 show the time variations of the acceleration data a and steering angle data s acquired at a prescribed time interval. R and L indicate the right and left of the vehicle.

Under a normal driving condition, because small course corrections are made, there are continuous small-amplitude corrections such as shown in FIG. 6, and when driving around a curve, the steering angle increases and decreases slowly. However, if the driver eyes are taken from the road, so that the vehicle swerves from a lane or swerves from left to right within a lane, or if a curve is made with excessive speed, thereby requiring a sudden steering wheel change to maintain the running direction, a large amplitude occurs as a singular event, as shown in FIG. 8.

Thus, in this embodiment of the present invention, the amount of steering angle change or amount of lateral movement of the vehicle according to an acceleration sensor is calculated and the points at which sudden changes occur are extracted, so as to detect abnormal driving. The equation used for this calculation is as follows.

$$Zn = Dn - \left(\sum_{k=0}^{m} Dn - k\right) / (m+1)$$

In the above equation Zn is the amount of change in running information at time Tn, Dn is the lateral acceleration or the steering angle at time Tn, Dn-k is the lateral acceleration or the steering angle at the time Tn-k, and m is the number of past data to be used as samples ($m \geq 1$).

In the above-noted equation, the second term on the right is the average data for past acceleration or steering angle.

Figure 7:
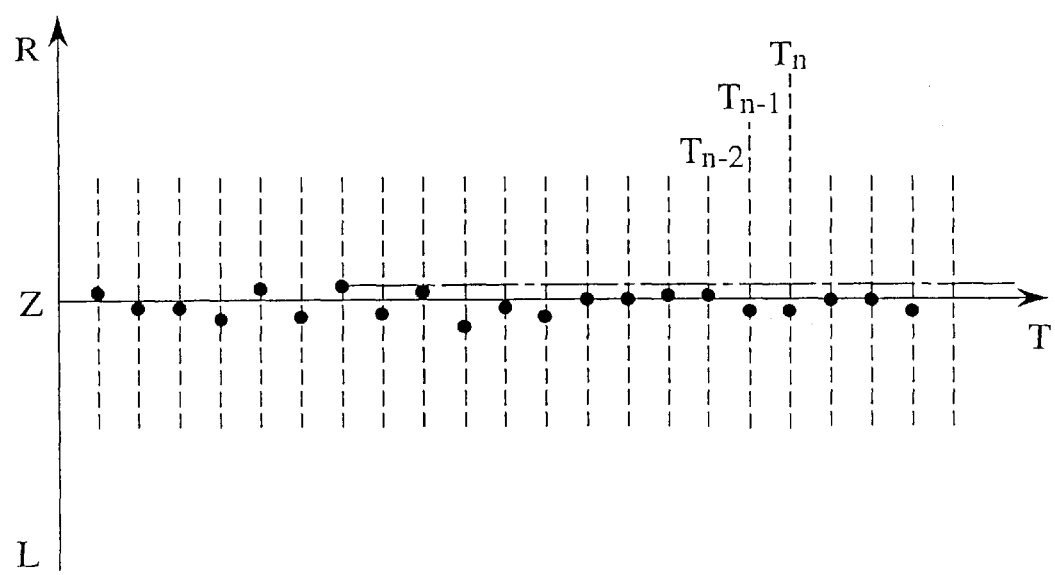
FIG. 7 is a drawing illustrating in schematic form the operation of calculating the threshold value for the amount of change of steering wheel angle performed in the alerting system shown in FIG. 1.

The results of using the above-noted equation to calculate the running change amount Z of the vehicle from the data of FIG. 6 and FIG. 8 are shown in FIG. 7 and FIG. 8, respectively. In these drawings, R and L indicate the right and left of the vehicle.

In order to judge whether the calculated running change amount Z is normal or abnormal, it is necessary to establish judgment values (threshold values TR and TL) (step ST6).

However, because different drivers have different characteristic driving patterns (there are drivers which make large amplitude changes even with normal driving, and those who make only small changes), if the criteria values are fixed, when the system is used with a driver who normally exhibits slightly rough driving habits, there will be frequent extractions of abnormal driving.

Figure 9:
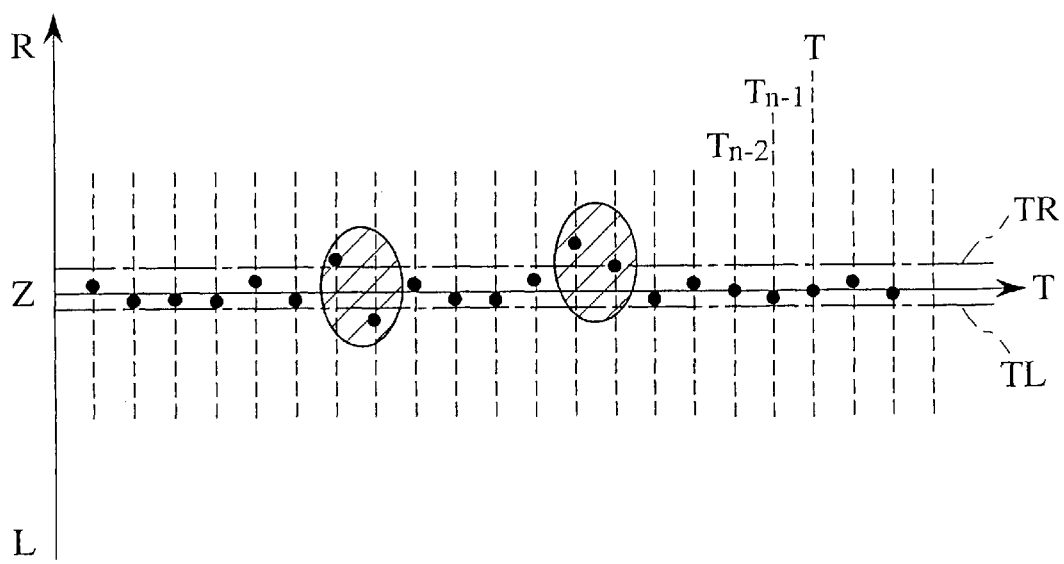
FIG. 9 is a drawing illustrating in schematic form the judgment of the amount of change in steering wheel angle performed in the alerting system shown in FIG. 1.

To accommodate this situation, as shown in FIG. 7 and FIG. 9, the maximum values TR and TL of the running change amount calculated when not using the cellular telephone are taken as threshold values between the normal driving condition and the abnormal driving condition, and when the running change amount Z calculated during use of the cellular telephone exceeds a threshold value, a judgment is made that the driving is abnormal. The areas marked by hatching in FIG. 9 indicate times of abnormal driving.

The above method of judgment enables detection of abnormal driving that takes into consideration the individual driver's driving habits.

According to the embodiment as described above, by obtaining the longitudinal acceleration of the vehicle, it is possible to calculate the running change amount of the vehicle, enabling extraction of sudden acceleration using the throttle and sudden stopping using the brakes, making it possible to make a judgment about the abnormal driving with regard to the longitudinal direction, similar to method noted above.

If the running condition is analyzed in all three directions (left-to-right, front-back, and vertical) so as to perform an overall analysis of the behavior of the vehicle in all three directions, it is possible to detect with precision the running conditions when the cellular telephone 4 is being used and when it is not in use, thereby enabling a more detailed judgment as to whether the driving is normal or abnormal.

The above-noted processing can be described with regard to the flowchart of FIG. 2, wherein a judgment is first made as to whether the vehicle is running (step ST7) and, if the vehicle is running, a determination is made, by the results of detection by a direction signal sensor, as to whether the vehicle is making a left or right turn or a lane change (step ST8).

Next, in the case in which the vehicle was not making a left or right turn or a lane change, a comparison is performed between a threshold value with respect to the running speed change amount obtain as described above as a reference value and the current running speed change amount as indicated by the currently output running information from the running condition detection apparatus 6. If, as shown in FIG. 8, the running speed change amount is large, or if, as shown in FIG. 9, a comparison performed between a threshold value with respect to the steering angle change amount obtained as noted above as a reference value with the steering angle change amount as indicated by the current output from the running condition detection apparatus indicates that the amount of steering angle change is large, a judgment is made that the driving is unstable (step ST9).

Next, a first alarm message is generated and a "Dangerous driving! Pay attention to your driving" message is output from the alarm apparatus 9 so as to alert the vehicle operator (steps ST10 and ST11).

Additionally, if the vehicle operator continues to use the cellular telephone 4 even after issuing this message, each time the running speed changes greatly, and each time there is a large change in the steering angle, the unstable condition could in cases be detected by the CPU of the controller 8 (step ST9).

In this case, if the additional alarm judgment is made (step ST10), a second alarm message "Either stop the vehicle or hang up before continuing to drive" is issued from the alarm apparatus 9 as a strong warning to the vehicle operator (steps ST10 and ST12).

Even if there is no large change in the running speed or no large change in the steering angle, in the case in which information indicating the operation of a directional signal is included in the running information output from the running condition detection apparatus 6, so that a large change in the running speed and steering angle of the vehicle can be expected, the CPU of the controller 8 detects this condition (step ST8).

When this occurs, the alarm 3 message "Pay attention to your driving", as a warning to the vehicle operator (step ST13).

Thereafter, if the vehicle operator removes the cellular telephone 4 from his or her ear, or sets the power switch of the cellular telephone 4 to the off condition, or performs an on-hook operation, so that information indicating that the cellular telephone 4 is not being used is output from the cellular telephone usage judgment circuit of the telephone call detection apparatus 5, the CPU of the controller 8 detects this (steps ST3 and ST14) and generates an alarm 4 message of "Place the telephone in an easily reachable location" that is output from the alarm apparatus 9, thereby alerting the vehicle operator to place the cellular telephone 4 in a location from which it can be easily reached the next time it is to be used (step ST17).

Next, when the vehicle 2 is stopped, based on running information output from the running condition detection apparatus 6, the CPU of the controller 8 detects this condition (step ST15).

After the processing to record the running information in the data recording apparatus 7 is stopped (step ST16), return is made to the initial condition (steps ST7 and ST1).

As described above, in this embodiment of the present invention, if the cellular telephone 4 is being used by the vehicle operator while driving the vehicle, if the running condition of the vehicle becomes unstable, or if a directional signal is operated and the speed or course of the vehicle are greatly changed, these conditions are detected and the vehicle operator is alerted to this condition.

If the vehicle operator attempts to use the cellular telephone 4 while driving the vehicle 2, or if the course or speed of the vehicle 2 becomes unstable, or if there is a large possibility of them becoming unstable, a message is issued to alert the vehicle operator to be careful.

Therefore, this embodiment of the present invention effectively reduces the adverse effects of using a cellular telephone during driving, while maintaining the convenience offered by the cellular telephone 4.

The second embodiment of an alerting system according to the present invention is described below.

Figure 10:
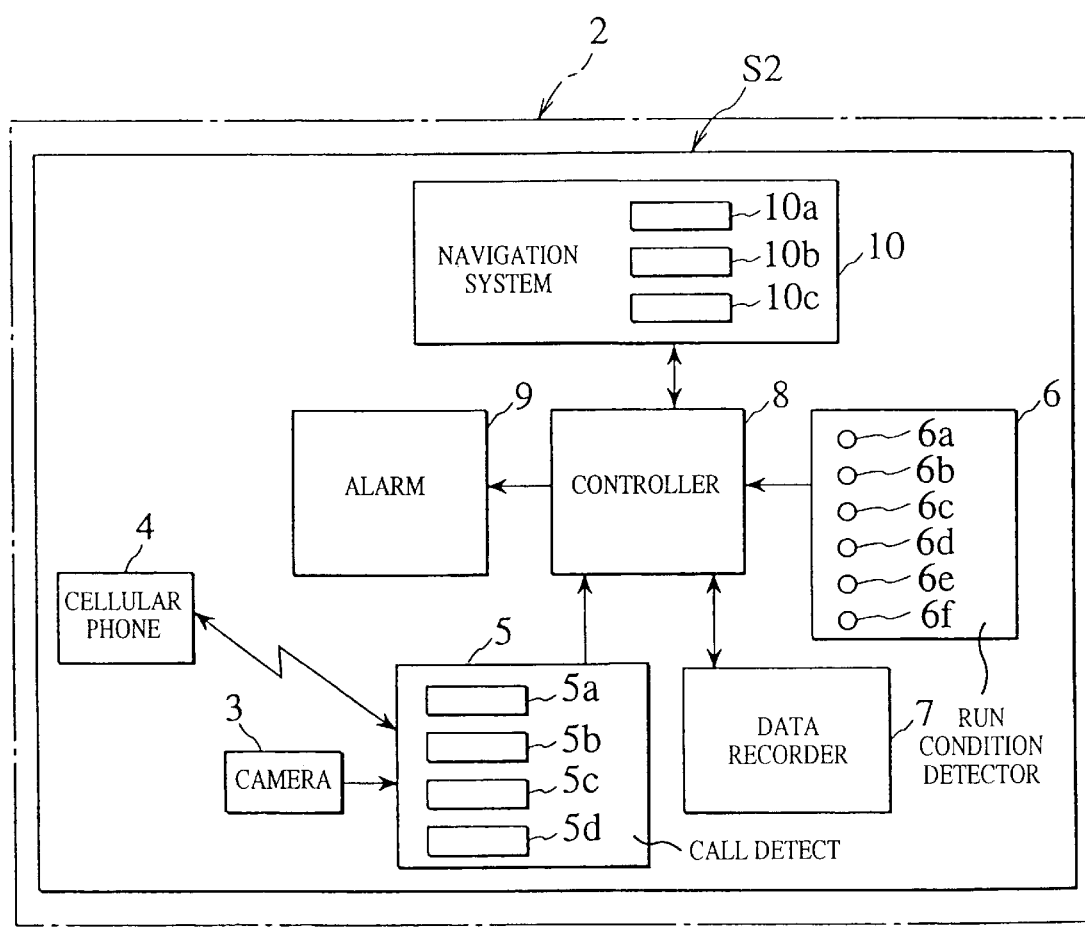
FIG. 10 is a block diagram showing an alerting system of the second embodiment according to the present invention.

FIG. 10 is a block diagram showing the second embodiment, in which elements corresponding to elements in FIG. 1 are assigned the same reference numerals and are not explicitly described herein.

Figure 11:
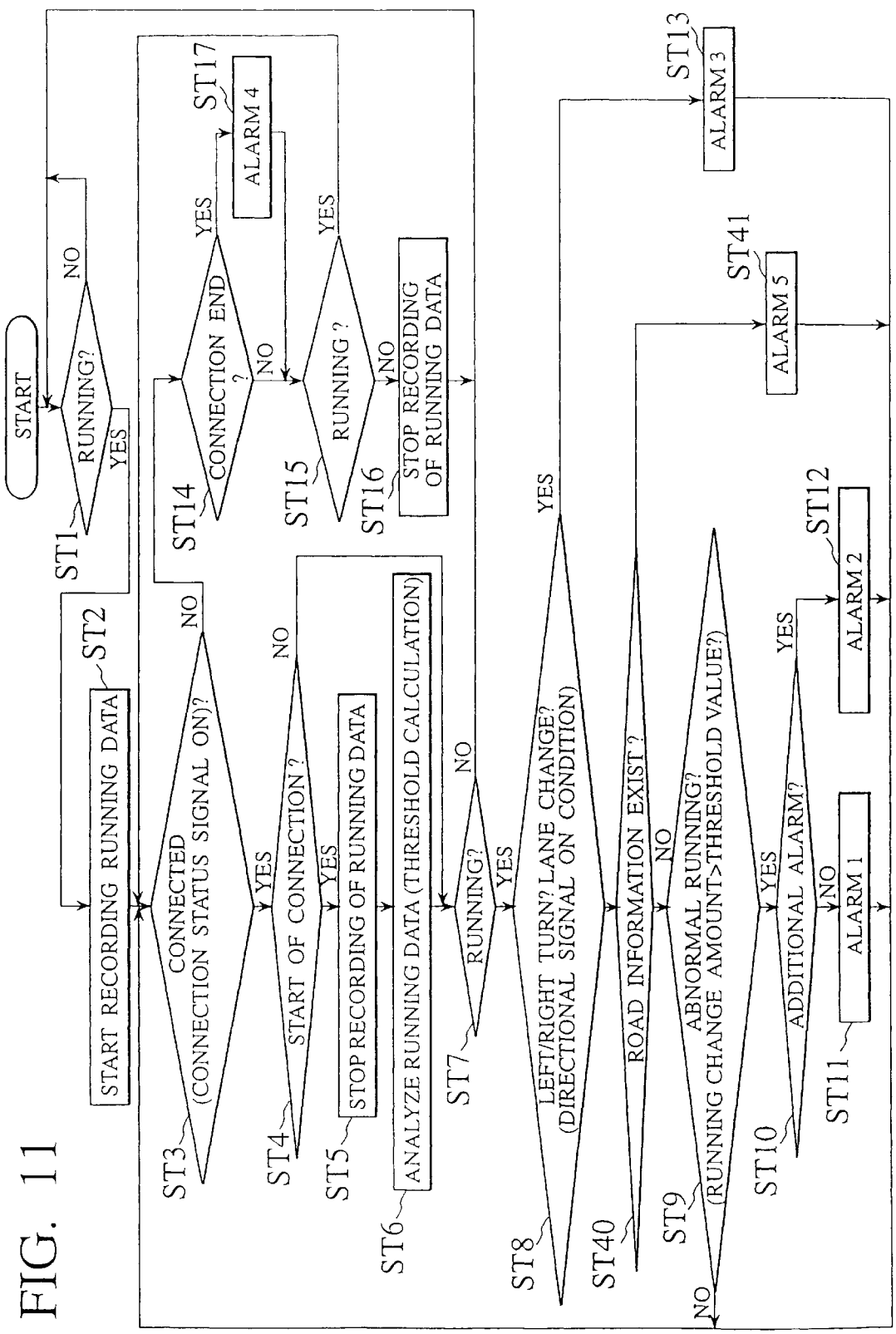
FIG. 11 is a flowchart showing the operation of the alerting system shown in FIG. 10.

FIG. 11 is a flowchart of the operation of the second embodiment, with elements corresponding to elements in FIG. 2 assigned the same reference numerals and omitted from the description of the second embodiment.

The second embodiment of the alerting system S2 differs from the first embodiment S1 shown in FIG. 1 in that a car navigation apparatus 10 is provided in the vehicle 2, this car navigation apparatus 10 using a radio beacon receiving circuit 10a, a light beacon receiving circuit 10b, and a GPS receiving circuit 10c or the like to receive a radio beacon, a light beacon or a GPS signal or the like, the received contents being decoded and used to determine the road information for the position and direction of travel of the vehicle 2.

That is, the difference in the second embodiment from the first embodiment is that, when the vehicle 2 approaches a sudden curve, a continuous curve, an intersection, a railroad crossing, a congested area, or an area in which lane changes are restricted, as shown in the flowchart of FIG. 11, the CPU of the controller 8 detects this condition (step ST40) and an alarm 5 message "Careful! Coming up to a sudden curve" is issued from the alarm apparatus 9 to warn the driver (step ST41).

Thus, in the second embodiment, by means of the radio beacon receiving circuit, light beacon receiving circuit, or GPS receiving circuit or the like of the car navigation apparatus 10, a radio beacon, light beacon, or GPS signal or the like is received, the contents thereof being decoded and, when the vehicle 2 approaches a sudden curve, a continuous curve, an intersection, a railroad crossing, a congested area, or an area in which lane changes are restricted, the CPU of the controller 8 detects this and causes a variety of messages to be issued to the vehicle operator from the alarm apparatus 9 as a warning.

The constitution of this embodiment, therefore, provides a more detailed message output than the first embodiment.

In this embodiment, therefore, if the vehicle operator attempts to use the cellular telephone 4 while driving, or is already using the cellular telephone 4, and the course or running speed of the vehicle 2 becomes unstable or there is a great possibility that it will become unstable, the vehicle operator is alerted to this condition and the need to drive carefully by a message. Additionally, if an attempt is made to use the cellular telephone 4 while driving the vehicle 2, or is already using the cellular telephone 4, if there is a location ahead through which driving is difficult, the vehicle operator is alerted to this fact, thereby enabling an effective reduction in the adverse effect of using a cellular telephone while driving, while maintaining the convenience of the cellular telephone 4.

The third embodiment of an alerting system S3 according to the present invention is described below.

With regard to this embodiment as well, elements that correspond to elements of the first embodiment are assigned the same reference numerals, and are not explicitly described herein.

Figure 12:
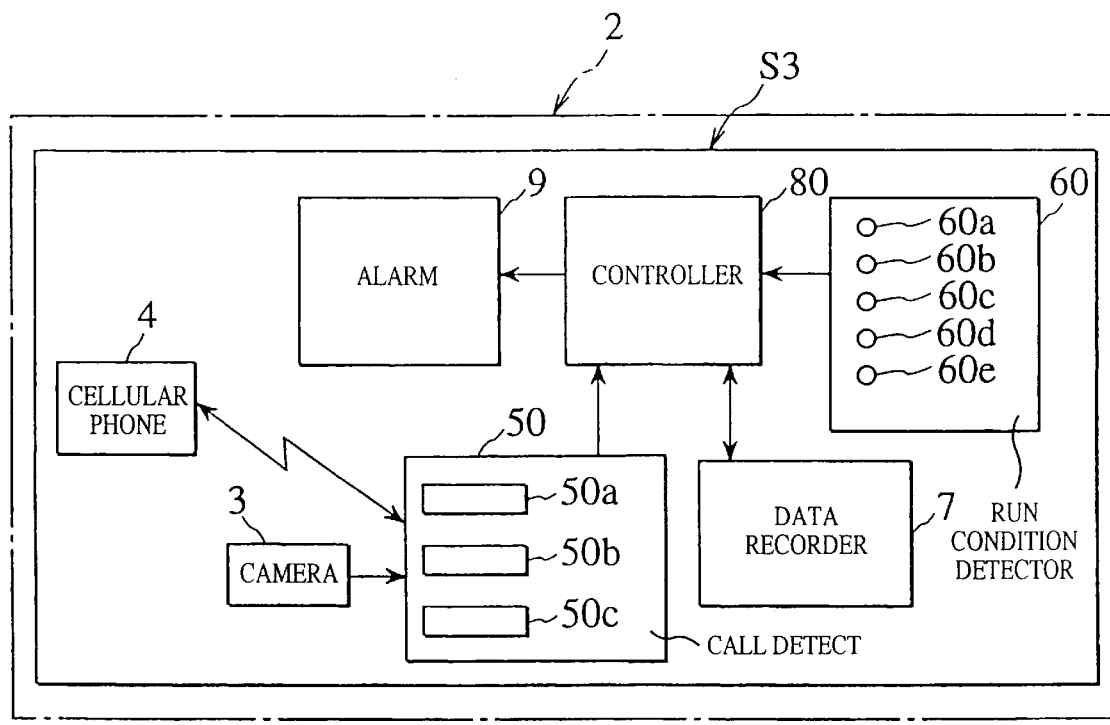
FIG. 12 is a block diagram showing an alerting system of the third embodiment according to the present invention.

The difference in the alerting system S3 as shown FIG. 12 with respect to the alerting system S1 shown in FIG. 1 is that, in place of the telephone call detection apparatus 5, the running condition detection apparatus 6, an the controller 8, this embodiment uses a simply configured telephone call detection apparatus 50, a running condition detection apparatus 60, and a controller 80, thereby simplifying the configuration of and processing performed by the overall system, while reducing the overall cost of the system, in which when the vehicle operator uses the cellular telephone 4 and driving becomes unstable, or there is a danger of driving becoming unstable, a message is issued from the alarm apparatus 9, thereby alerting the operator of this condition.

The telephone call detection apparatus 50 of third embodiment of the present invention has an image processing circuit 50a, which when the image recording switch (not shown in the drawing) is placed in the on condition, a comparison is made between the contents of the picture signal output from the CCD camera apparatus (face of the vehicle operator) and previously stored pictures of operator when using and not using a cellular telephone, so as to make a judgment as to whether or not the vehicle operator is using the cellular telephone 4, and if the judgment is made that the operator was using the cellular telephone 4, or was about to use the cellular telephone 4, generates an interrupt signal.

The embodiment also has a radio signal strength detection circuit 50b which, if the power of the cellular telephone 4 in the vehicle 2 on and a radio signal indicating that the cellular telephone 4 can be used or a radio signal indicating the content of a telephone call is transmitted from the cellular telephone 4, makes a judgment as to whether or not the strength of the radio signal is above a previously set level is made and, if the strength of the radio signal is above the previously set level, detects this condition and generates an interrupt signal.

Additionally the telephone call detection apparatus 50 of the third embodiment has a cellular telephone interception circuit 50c which, when the power to the cellular telephone 4 in the vehicle 2 is in the on condition and a radio signal from the cellular telephone 4 or a radio signal to the cellular telephone 4 is being transmitted, receives and demodulates this radio signal, and, based on the dialing number content obtained from this demodulation operation and a previously registered cellular telephone ID (such as a telephone number), makes a judgment as to whether the cellular telephone 4 is the cellular telephone of the vehicle operator or a passenger, for example, and generates an interrupt signal in the case in which the cellular telephone 4 is being used by the vehicle operator.

Even if the image recording switch is not in the on condition, if the power switch of the cellular telephone 4 in the vehicle 2 is in the on condition and a radio signal indicating that the cellular telephone 4 can be used is being transmitted, or a radio signal indicating the content of a telephone call is being transmitted from the cellular telephone 4, the telephone call detection apparatus 50 generates an interrupt signal that is supplied to the controller 80, makes a judgment as to whether the cellular telephone 4 is the cellular telephone of the vehicle operator or of a passenger, for example, and, if the cellular telephone 4 was the vehicle operator's cellular telephone, generates an interrupt signal and supplies it to the controller 80.

In the case in which the image recording switch is in the on condition, the telephone call detection apparatus 50 makes a judgment with regard to the above-described radio signal from the cellular telephone 4, compares the picture of the face of the vehicle operator contained in the picture signal output from the CCD camera apparatus and previously stored pictures of the vehicle operator's face when using and when not using a cellular telephone, so as to make a judgment of whether or not the vehicle operator is using the cellular telephone 4, and, if the judgment is that the operator is using the cellular telephone 4, generates an interrupt signal and supplies this interrupt signal to the controller 80.

The running condition detection apparatus 60 has a steering sensor 60a for detecting the steering angle change, an acceleration sensor 60b for detecting the acceleration of the vehicle 2, a vehicle speed sensor 60c for detecting the speed of the vehicle 2, a parking brake sensor 60d for detecting the off condition of the parking brake, and a direction signal sensor 60e for detecting the operation of a directional signal of the vehicle 2 and generating an interrupt signal when this operation is detected.

The running condition detection apparatus 60 generates running information, such as information indicating whether the vehicle 2 is running or stopped, the amount of steering angle change (information which indicates the degree of swerving and whether a lane change is made), and supplies this information to the controller 80, in addition to generating an interrupt signal when a direction signal is operated and supplying this interrupt signal to the controller 80.

A three-dimensional sensor which senses the lateral (left-to-right), longitudinal (front-back) and vertical acceleration can be used as the acceleration sensor 60b. The steering angle data detected by the steering sensor 60a can be used as the lateral acceleration data, and this embodiment is described for the case of using the steering angle.

Figure 13:
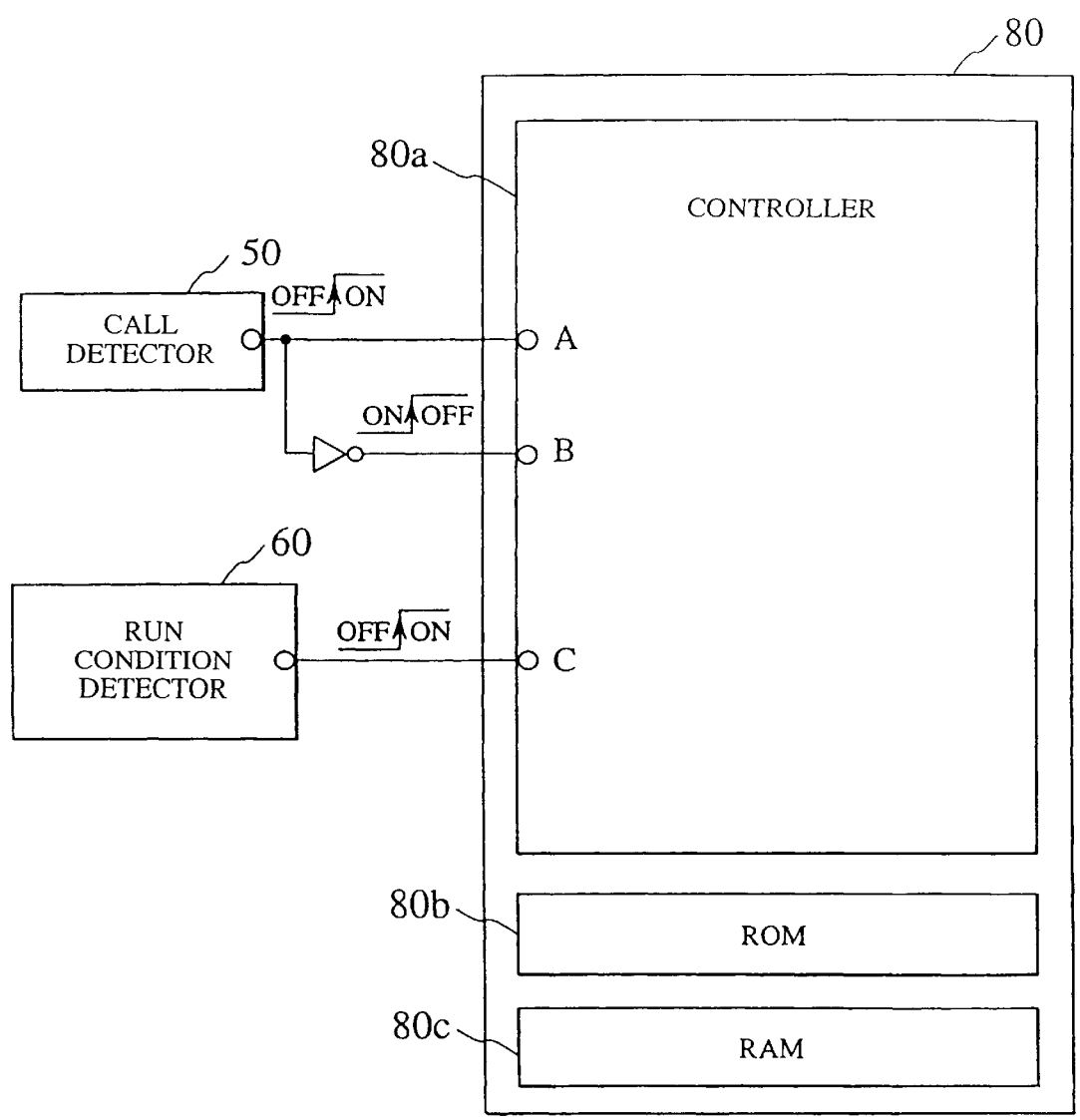
FIG. 13 is a block diagram showing an example of the detailed circuit configuration of the controller shown in FIG. 12.

As shown in FIG. 13, the controller 80 has a CPU 80a for performing various information processing, a ROM 80b for storage of a prescribed program that is executed by the CPU and data, and a RAM 80c that is used as a working area by the CPU.

When the engine switch of the vehicle 2 is in the on condition and when prescribed conditions are satisfied, the controller 80 acquires running information output from the running condition detection apparatus 60 at a prescribed time interval, and causes the data recording apparatus 7 to record this information, and, if an interrupt signal is output from either the telephone call detection apparatus 50 or the running condition detection apparatus 60, makes a judgment as to whether or not the operator of the vehicle is using the cellular telephone 4 and the driving of the vehicle is disturbed. If the judgment is that the driving of the vehicle is indeed being disturbed, the controller 80 generates alarm information and a warning message is issued from the alarm apparatus 9 to alert the vehicle operator.

One internal interrupt factor of the CPU 80a is a timer interrupt.

External interrupt factors for the CPU 80a include a connection on interrupt (A) which occurs on the rising edge at the change from the connection off to the connection on condition of the call detection signal from the telephone call detection apparatus 50, a connection on interrupt (B) which occurs also occurs on the rising edge occurring when the connection detection signal from the telephone call detection apparatus 50 is inverted so as to change from the off condition to the on condition, and the directional signal on interrupt (C) occurring at the rising edge occurring when the directional signal detection signal from the running condition detection apparatus 60 changes from the off condition to the on condition.

Next, the operation of this embodiment will be described, with references being made to the flowcharts of FIG. 14 to FIG. 18.

Figure 14:
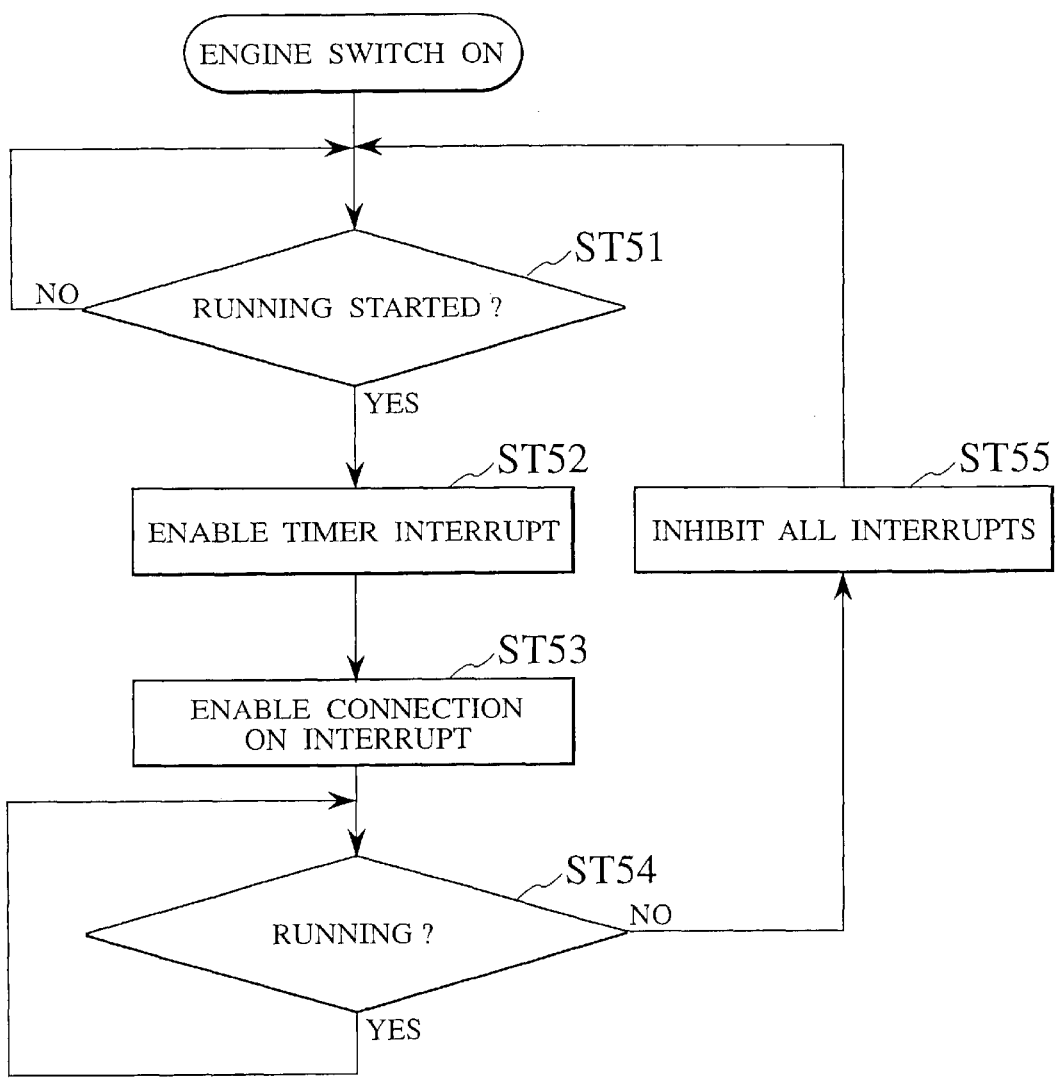
FIG. 14 is a flowchart showing the operation of the alerting system shown in FIG. 12.

First, when the engine switch of the vehicle 2 is placed in the on condition, as shown by the flowchart of FIG. 14, running information output from the running condition detection apparatus 60 is captured, and a judgment is made as to whether or not the vehicle 2 is currently running and, at the point at which the vehicle 2 starts moving, a timer is started (step ST51).

Next, at a prescribed time interval, timer interrupts required for the analysis of running conditions and connection on interrupts required to detect the possible use of the cellular telephone 4 by the operator are enabled (steps ST52 to ST54).

Figure 15:
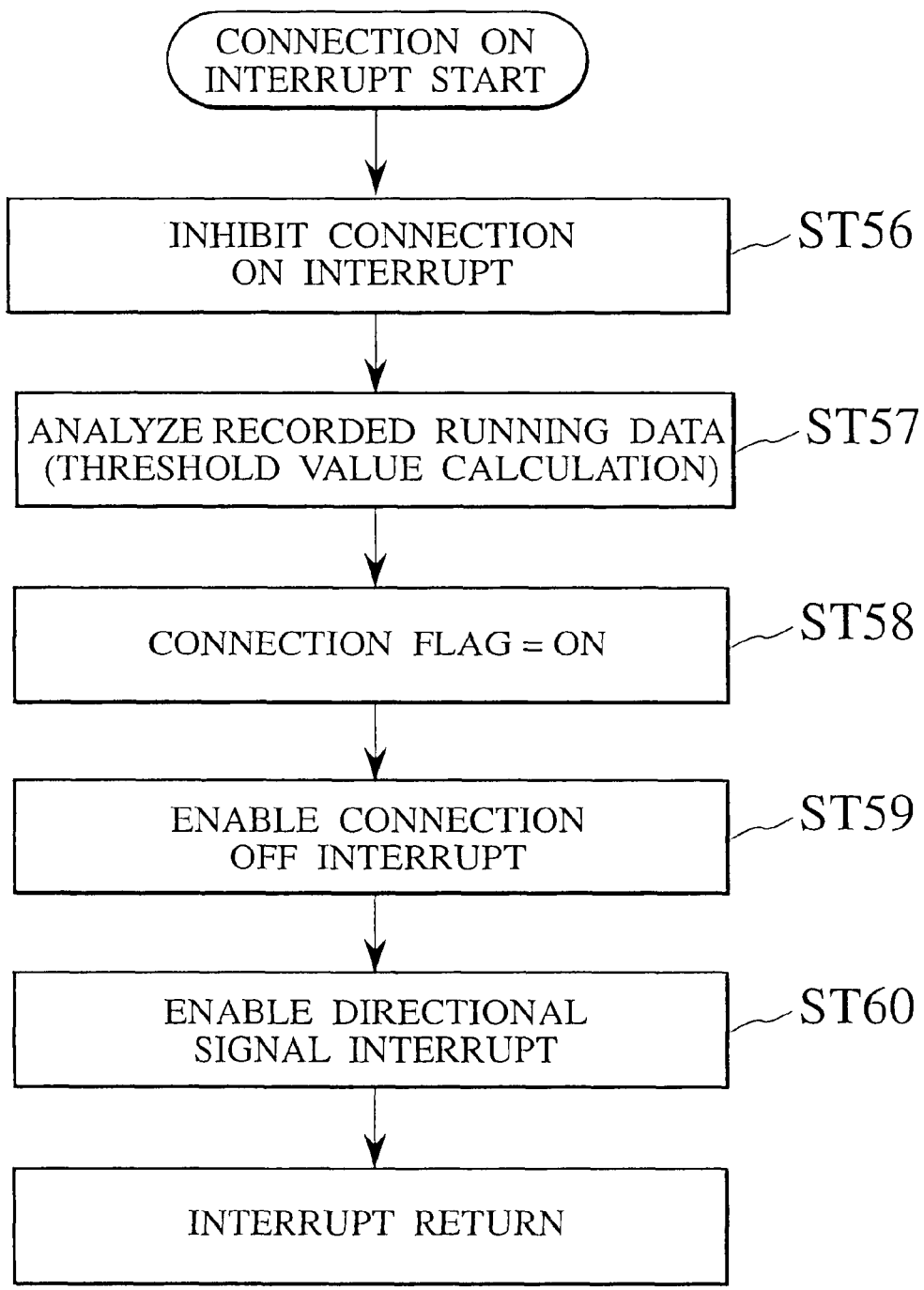
FIG. 15 is a flowchart showing the processing of a connection on interrupt in the alerting system shown in FIG. 12.

In this condition, if an interrupt signal indicating that the vehicle operator used the cellular telephone 4 or an interrupt signal indicating that the vehicle operator attempted to use the cellular telephone 4 is output from the telephone call detection apparatus 50, the CPU of the controller 80 starts the processing of the connection on interrupt as shown in the flowchart of FIG. 15.

As shown in FIG. 15, first the connection on interrupt is disabled, so that even if an interrupt signal is output once again from the telephone call detection apparatus 50 during processing of the original interrupt, the second interrupt is not accepted (step ST56).

Next, based on running information stored in the data recording apparatus 7, a threshold value required to judge whether or not the amount of running change is abnormal and a threshold value required to judge whether or not the amount of steering angle change is normal are generated and stored (step ST57).

Next, the CPU of the controller 80 sets a connection flag, which indicates that the vehicle operator used the cellular telephone 4 or might use the cellular telephone 4, to on (step ST58).

Next, the connection off interrupt is enabled (because a call is in progress, only the interrupt for detecting the end of the call is enabled), and when an interrupt signal is again output from the telephone call detection apparatus 50, this is accepted (step ST59), a directional signal interrupt required to detect the operation of a directional signal of the vehicle 2 being also enabled (step ST60).

Figure 16:
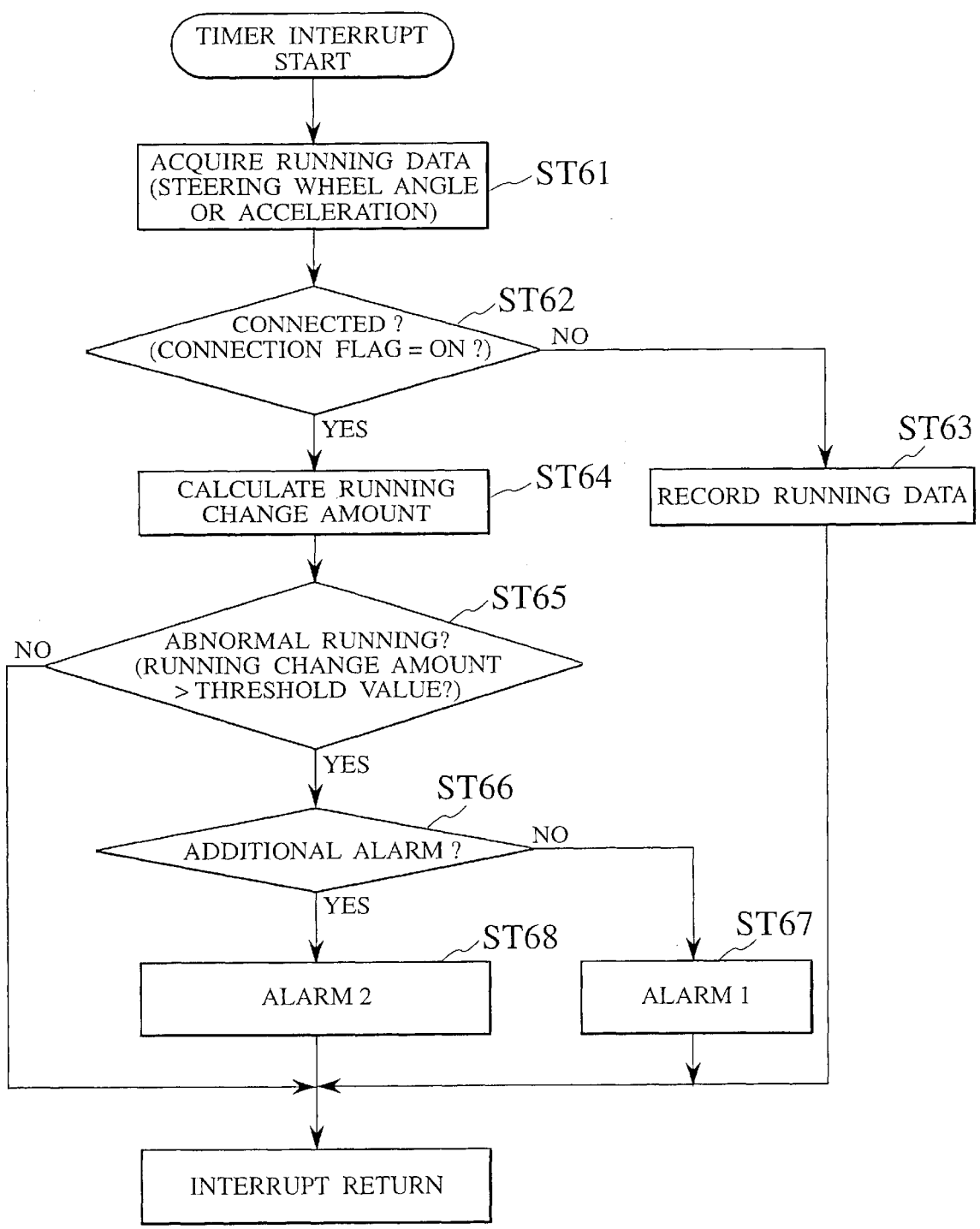
FIG. 16 is a flowchart showing the processing of a directional signal interrupt in the alerting system shown in FIG. 12.

Then, when a prescribed amount of time has elapsed from the start of the timer, the time-up condition occurs, at which point the CPU of the controller 80 starts the interrupt processing indicated in the flowchart of FIG. 16.

In FIG. 16, first the current running condition that is output from the running condition detection apparatus 60 is captured (step ST61).

Next, a check is made as to whether the connection flag is on and, it the connection flag is off, the judgment is made that the vehicle operator is not currently using the cellular telephone 4 (step ST62), the running conditions captured on this pass being supplied to and recorded in the data recording apparatus 7 (step ST63).

However, if the connection flag was on when it was checked as noted above, the CPU of the controller 80 makes the judgment that the vehicle operator is currently using the cellular telephone 4 or will use the cellular telephone 4 (step ST62), the running change amount and steering angle change amount being determined base on the running conditions captured on this pass (step ST64).

Next, comparisons are made of the running change amount and the steering angle change amount with the running change threshold value and steering angle change threshold value, respectively, that were obtained by the processing of the connection on interrupt and, if either of these values exceeds the corresponding threshold value, judgment is made that driving has been disturbed (step ST65).

A check is made of the number of times driving has been judged to have been disturbed after the connection flag is set to the on condition. If the number of such driving disturbance judgments since the connection flag was set to on is 1 (step ST66), the CPU of the controller 80 generates the alarm 1 message, "Dangerous driving! Pay attention to your driving" that is output from the alarm apparatus 9 so as to alert the vehicle operator to this condition (step ST67).

Thereafter, each time the time-up condition occurs, the above-described timer interrupt processing is performed (steps ST61 to ST65) and, if at this timer interrupt a judgment is made again that the driving is being disturbed (step ST66), the CPU of the controller 80 judges that the vehicle operator is using the cellular telephone 4 and that this is disturbing his or her driving, thereby triggering the generation of the alarm 2 message of "Either stop the vehicle or hang up before continuing to drive" that is issued from the alarm apparatus 9, so as to alert the driver to this condition (step ST68).

Figure 17:
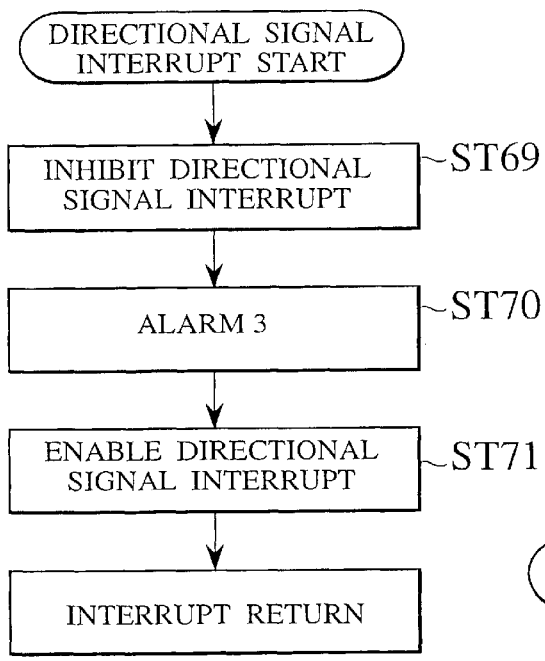
FIG. 17 is a flowchart showing the processing of a timer interrupt in the alerting system shown in FIG. 12.

Even if there is a large change in the running speed or a large change in the steering angle, at the above-described connection on interrupt processing, with the direction signal interrupt enabled, if the interrupt signal indicating that a direction signal has been operated is output, the CPU of the controller 80 starts processing of the directional signal interrupt as shown in the flowchart of FIG. 17.

In FIG. 17, first the directional signal interrupt is disabled, so that a reoccurrence of the directional signal interrupt during this interrupt processing will not be accepted even if this interrupt signal is output from the running condition detection apparatus 60 (step ST69).

If a judgment is thereafter made that the running speed change or steering angle change of the vehicle 2 is large, the alarm 3 message of "Pay attention to your driving" is issued by the alarm apparatus 9 so as to alert the vehicle operator of this condition (step ST70).

Then the directional signal interrupt is enabled, so that if an interrupt signal is again output from the running condition detection apparatus 60, this interrupt signal is accepted (step ST71).

Figure 18:
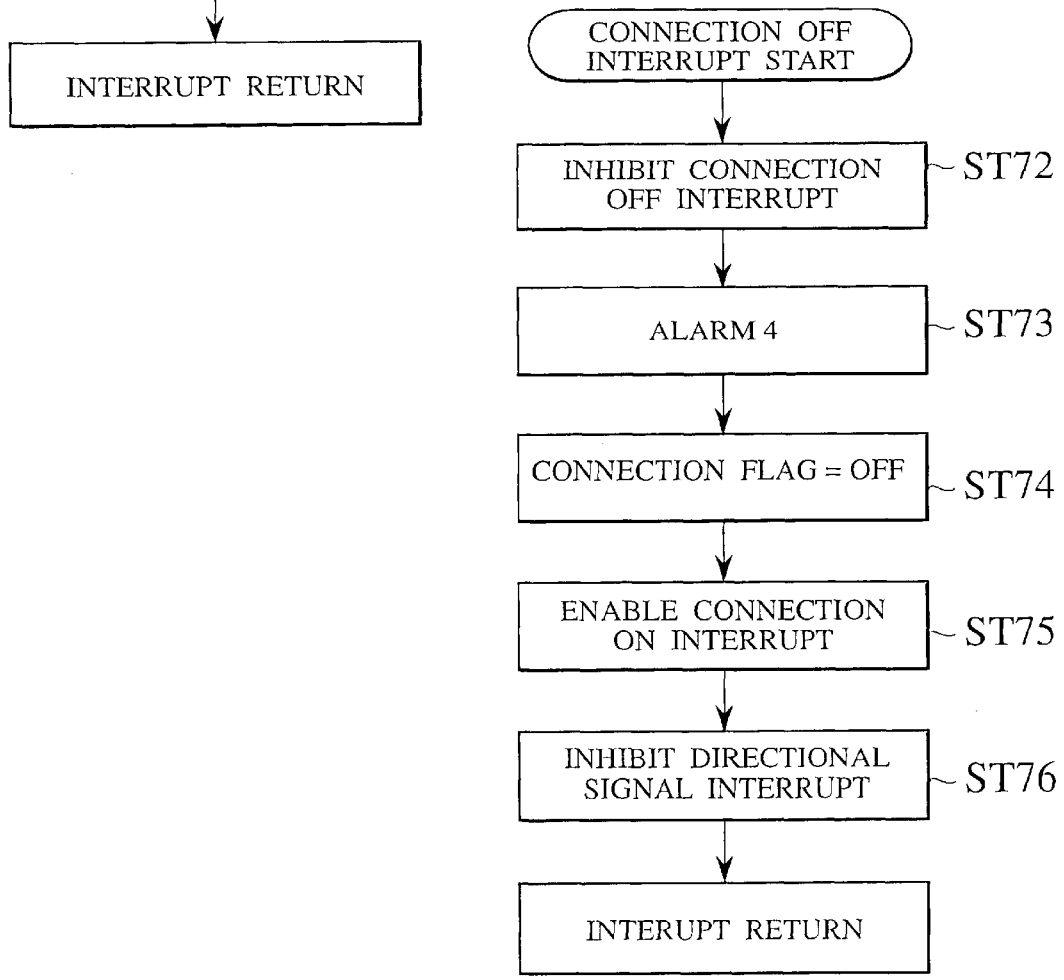
FIG. 18 is a flowchart showing the connection off interrupt in the alerting system shown in FIG. 12.

Thereafter, if the vehicle operator removes the cellular telephone 4 from his or hear face, turns the power of the cellular telephone 4 off, or performs the on-hook operation, so that the connection interrupt signal is no longer output from the telephone call detection apparatus 50, the CPU of the controller 80 starts the processing of the connection off interrupt as shown in the flowchart of FIG. 18.

In FIG. 18 first the connection off interrupt is disabled, so that even if an interrupt signal is not output from the telephone call detection apparatus 50 during the processing of the connection off interrupt there will be no restarting of the connection off interrupt processing (step ST72).

Next, the alarm 4 message "Place the telephone in an easily reachable location" is issued from the alarm apparatus 9, so that the cellular telephone 4 is in an easily reachable location the next time the vehicle operator wishes to use it (step ST73).

Next, the CPU of the controller 80 sets the connection flag to the off condition and, after storing the fact that the vehicle operator is not currently using the cellular telephone 4 (step ST74), the connection on interrupt is enabled, so that when the vehicle operator again uses the cellular telephone 4 and an interrupt signal is output from the telephone call detection apparatus 50, this interrupt can be accepted (step ST75).

Then, even if an interrupt signal indicating that a directional signal was operated is output from the running condition detection apparatus 60, the start of processing of the directional signal interrupt is inhibited (step ST76).

Thereafter, when the vehicle 2 is in the stopped condition, based on running information that is output from the running condition detection apparatus 60, the CPU of the controller 80 detects this condition and, as shown in the flowchart of FIG. 14, inhibits all interrupts, thereby going into the wait condition until the vehicle 2 is started once again (step ST55).

As described above, in this embodiment of the present invention based on interrupt signals output from the simply configured telephone call detection apparatus 50 and running condition detection apparatus 60, the controller 80, in response to the use of the cellular telephone 4 by the vehicle operator, makes a judgment as to whether or not driving is being disturbed, and whether or not a directional signal has been operated and the running condition has been greatly, outputting to the vehicle operator an appropriate message to the vehicle operator.

That is, in comparison with the first embodiment, the overall system configuration and processing algorithm in the third embodiment are simplified, thereby reducing the cost of implementing the system, while preventing disturbance to the driving of the vehicle even if the power switch of the cellular telephone 4 is on or the cellular telephone 4 is used while driving the vehicle 2, thereby effectively reducing the adverse effects of using the cellular telephone 4 during driving, while maintaining the convenience of the cellular telephone.

Furthermore, while in this embodiment the description was of the case in which the alerting system was implemented without use of the car navigation system, it is also possible to implement an alerting system which makes use of a car navigation system having a radio beacon circuit, a light beacon receiving circuit, and a GPS signal receiving circuit.

In the case of using a car navigation system, the radio beacon, light beacon, and GPS beacon or the like is received, and when the existence of an upcoming sudden curve, a continuous curve, an intersection, a railroad crossing, a congested area, or an area in which lane changes are restricted is detected ahead of the vehicle 2, an interrupt signal is generated by the car navigation system so as to interrupt the CPU of the controller 80 as a message is output from the alarm apparatus 9 so as to alert the vehicle operator to watch the road ahead.

In the above-described embodiments of the present invention, based on running information that is stored in the data recording apparatus 7, a threshold value required in judging whether or not the running change amount is abnormal, and a threshold value required in judging whether or not the steering angle change amount is abnormal are generated, judgments being made about whether driving is being disturbed, based on these threshold values and current running information being output from the running condition detection apparatuses 6 and 60. It is alternately possible to use an algorithm described below to make a judgment as to whether or not driving is being disturbed.

First, a correlation table of various behavior of the vehicle 2 and whether or not that behavior is representative of normal driving or abnormal driving is prepared. When the vehicle 2 is running, an analysis is made of the running information therefrom as to behavior (change) of the vehicle within a prescribed period of time, the correlation table being referred to in making a judgment of whether the behavior determined by this analysis is normal or abnormal behavior.

Figures 19, 20:
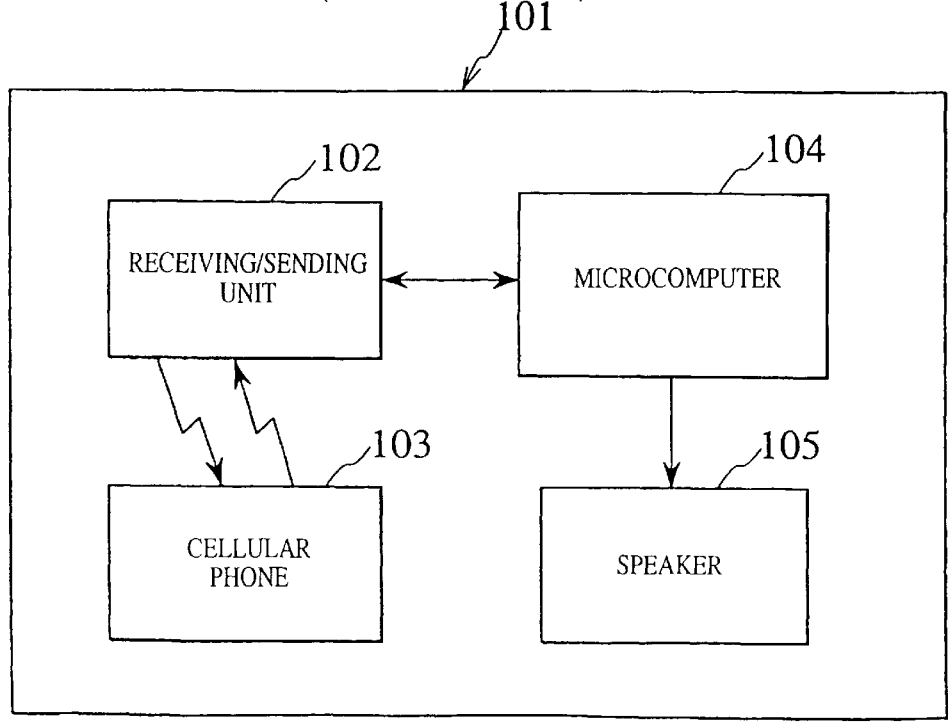
FIG. 19 is a drawing showing in schematic form the correlation between conditions in the alerting system according to the present invention.
FIG. 20 is a block diagram showing a cellular telephone usage restricting apparatus studied by the present inventors.

Specifically, to represent various vehicle behavior and whether or not the behavior is normal, the function f1(t) is used to represent the behavior of "continuous small changes" an the function f2(t) is used to represent the behavior of "occasional large changes," these being arranged a matrix such as shown by the correlation table 11 of FIG. 19.

When the vehicle 2 is running, if there is a continuous series of small changes but not many large changes (f1(t)=1, f2(t)=0), the driving is judged as normal, and when there are occasional large changes (f1(t)=1 or 0, f2(t)=1), the driving is judged to be unstable, and a message is issued to alert the driver of this condition.

If there are neither large changes nor small changes (f1(t)=0, f2(t)=0), the judgment is made that the vehicle operator is using the cellular telephone 4 and has his or her attention focussed thereon, and will possibly not pay attention to steering and braking, a message being then output to the operator to draw his or her attention to the need to drive carefully.

By doing the above, even with a simplified algorithm, when the vehicle operator uses the cellular telephone 4, it is possible to give appropriate advice to the vehicle operator in response to whether driving is stable or unstable, thereby effectively reducing the adverse effect of using the cellular telephone 4 while maintaining the convenience thereof.

Although in the above-described embodiments of the present invention, the CCD camera apparatus 3 is directed toward the face of the vehicle operator, it is also possible to switch the orientation of the CCD camera 3 so a to point it in the direction of travel of the vehicle 2, and to perform image processing on the acquired image, so as to perform image recognition of a white line in the road and, based on this recognition, to store lateral position changes within a lane, a comparison being made between the amount of lateral position change during driving when using the cellular telephone and when not using the cellular telephone, so as to enable detection of abnormal driving.

It will be understood that other embodiments of the present invention, within the scope of the technical concept thereof, are possible.

What is claimed is:

1. An alerting system comprising:

a telephone call detection section disposed in a vehicle to detect that a vehicle operator is using or is expected to use a portable communication terminal;

a running condition detection section disposed in the vehicle to detect a running condition of the vehicle;

a running condition judging section judging, based on a result from the running condition detection section, whether or not driving is unstable, or whether or not driving is expected to become unstable; and an alerting section alerting the vehicle operator when, based on a result from the telephone call detection section and a result form the running condition judging section, the vehicle operator is using the portable communication terminal or the vehicle operator is expected to use the portable communication terminal and the driving of the vehicle is unstable or expected to become unstable.

2. An alerting system according to claim 1, wherein when a radio signal equal to or above a prescribed strength is transmitted from within the vehicle, the telephone call detection section judges that the vehicle operator is using or will use the portable communication terminal.

3. An alerting system according to claim 1, wherein when transmission and reception of a radio signal including a number that identifies the portable communication terminal of the vehicle operator is done, the telephone call detection section judges that the vehicle operator is using or will use the portable communication terminal.

4. An alerting system according to claim 1, wherein when a picture showing the vehicle operator with the portable communication terminal near an ear thereof is obtained by use of an imaging apparatus provided within the vehicle, the telephone call detection section judges that the vehicle operator is using or will use the portable communication terminal.

5. An alerting system according to claim 1, wherein the running condition detection section detects the running condition of the vehicle by detecting swerving of the vehicle from steering angle data obtained by use of a steering sensor or acceleration data obtained by use of an acceleration sensor.

6. An alerting system according to claim 1, wherein the running condition detection section detects the running condition of the vehicle by detecting running of the vehicle or stopping of the vehicle from vehicle speed data obtained by use of a speed sensor or from parking brake condition data obtained by use of a parking brake sensor.

7. An alerting system according to claim 1, wherein the running condition detection section detects the running condition of the vehicle by detecting right and left turns or lane changes from direction signal condition data obtained by use of a direction signal sensor.

8. An alerting system according to claim 1, wherein the running condition judging section calculates a threshold value of a running change amount based on the vehicle running condition obtained by use of the running condition detection section when the portable communication terminal is not being used, uses the threshold value calculated thereby to judge a current size of the running change amount, and judges whether or not driving is unstable, based on a result of that judgment.

9. An alerting system according to claim 1, wherein a car navigation system disposed within the vehicle to receive and decode at least one of a radio beacon, a light beacon, and a GPS signal from a global positioning system satellite, and to judge a road condition information in a direction of travel of the vehicle, and wherein the alerting section, based on the road condition information, judges whether or not there is an area difficult to drive ahead and when the vehicle operator is using or expected to use the portable communication terminal, and alerts the vehicle operator that there is the area difficult to drive ahead.

10. An alerting system according to claim 1, wherein the telephone call detection section informs the alerting section of a detection result by means of interrupt processing.

11. An alerting system according to claim 1, wherein the running condition detection section informs the alerting section of a detection result by means of interrupt processing.

12. An alerting system according to claim 9, wherein the car navigation system informs the alerting section of a detection result by means of interrupt processing.

13. An alerting system according to claim 1, wherein a correlation table of various vehicle behavior for normal driving and abnormal driving is prepared beforehand, and wherein the running condition judging section judges whether or not driving is abnormal, based on the correlation table and a currently output running condition from the running condition detection section.

* * * * *